United States Patent [19]

Gokey et al.

[11] 4,213,040
[45] Jul. 15, 1980

[54] DIGITAL MICROFICHE AND APPARATUS FOR ACCURATELY POSITIONING THE MICROFICHE

[75] Inventors: Phillip E. Gokey; Donovan W. Hurlbut; Emma Lou Sederholm; Angel F. Terry, all of Whitewater, Wis.

[73] Assignee: News Log International, Incorporated, Whitewater, Wis.

[21] Appl. No.: 922,798

[22] Filed: Jul. 7, 1978

[51] Int. Cl.² .................. G06K 13/24; G06K 7/14; G06K 19/06
[52] U.S. Cl. .................. 235/476; 235/454; 235/487
[58] Field of Search ............ 250/569; 235/454, 456, 235/487, 494, 476

[56] References Cited

U.S. PATENT DOCUMENTS

| | | | |
|---|---|---|---|
| 2,594,358 | 4/1952 | Shaw | 235/487 |
| 3,549,895 | 12/1970 | Sidorsky | 250/569 |
| 3,598,967 | 8/1971 | Berler | 250/569 |
| 3,660,641 | 5/1972 | Levasseur | 235/494 |

Primary Examiner—Daryl W. Cook
Attorney, Agent, or Firm—Hill, Van Santen, Steadman, Chiara & Simpson

[57] ABSTRACT

Microfiche cards bear digital information. The digital information includes information to be read and/or information for controlling a microfiche card transport and/or scanner in order to accurately position the microfiche card for information retrieval. Static alignment techniques are also disclosed for aligning the information content of a microfiche card with respect to the transport.

44 Claims, 13 Drawing Figures

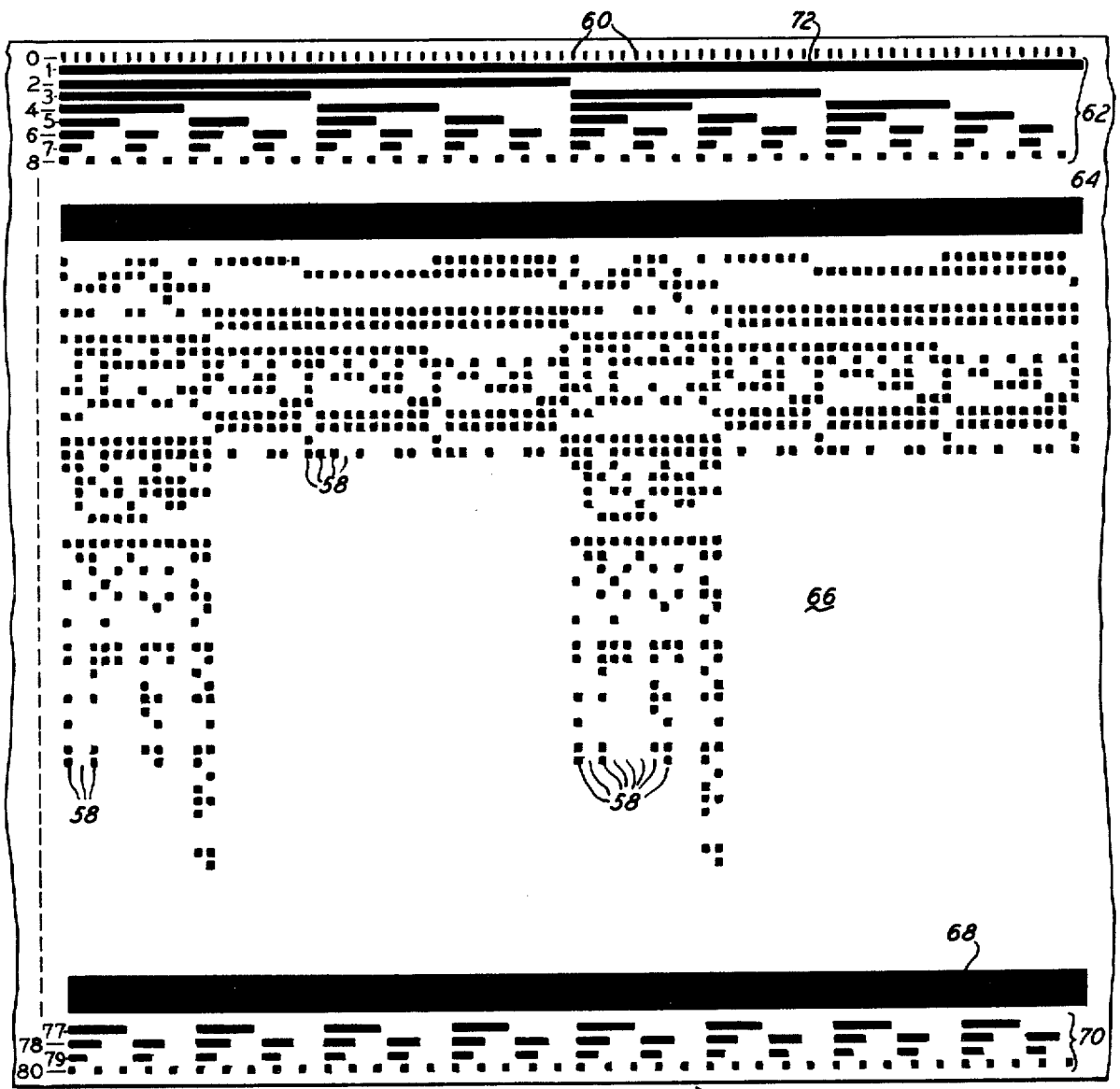
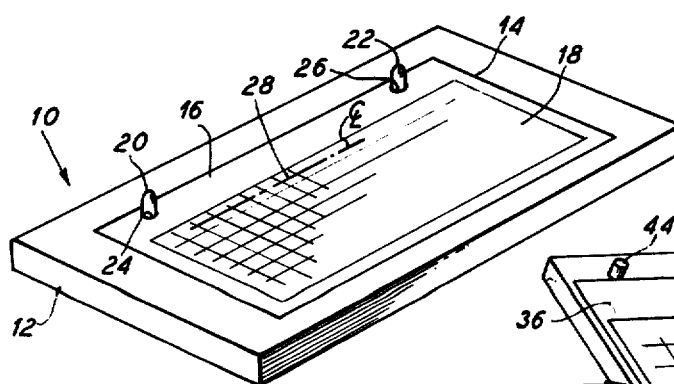
Fig. 1
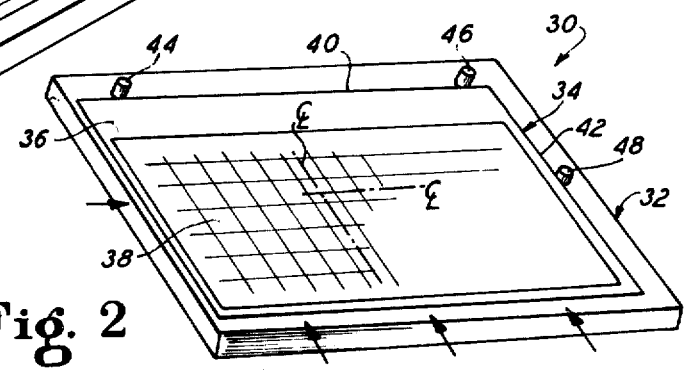
Fig. 2

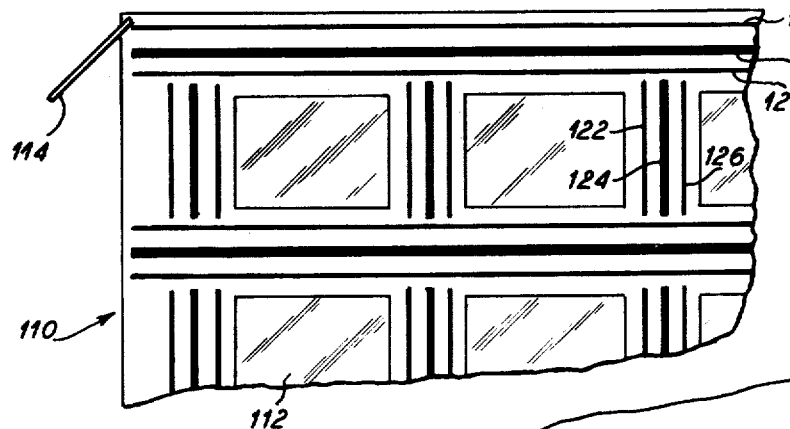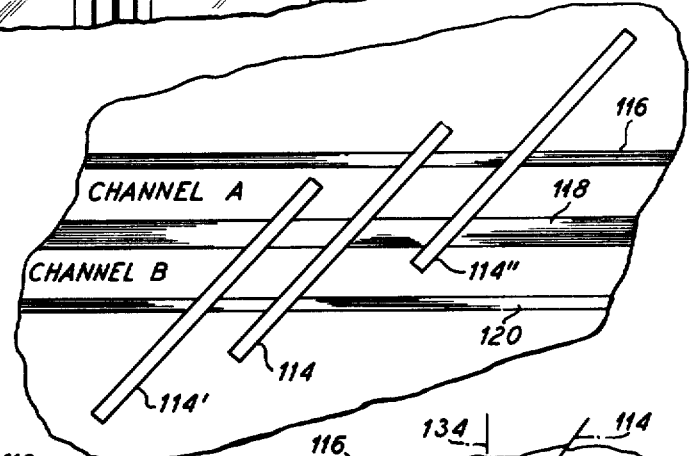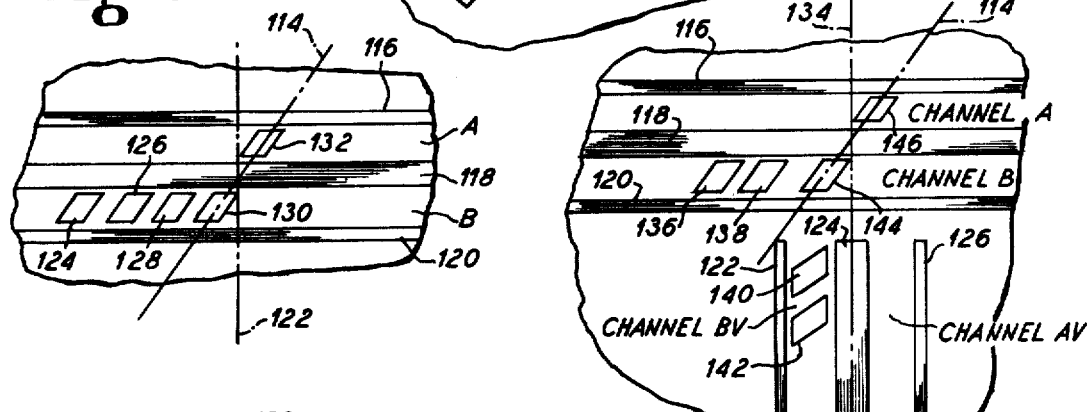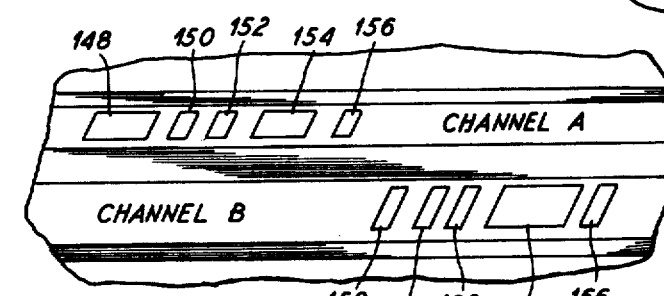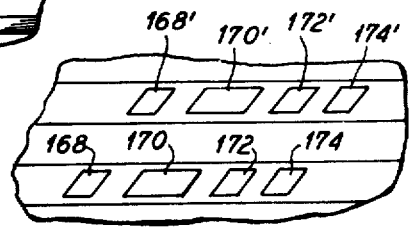

DIGITAL MICROFICHE AND APPARATUS FOR ACCURATELY POSITIONING THE MICROFICHE

BACKGROUND OF THE INVENTION

1. Field of the Invention

This invention relates to microfiche techniques, and is more particularly concerned with the provision of digital information on a microfiche card, which information is to be retrieved for data processing purposes and/or which information is to be retrieved for the purpose of accurately positioning the microfiche card for the purpose of optical scanning.

2. Description of the Prior Art

It is well known in the art to place control information on reel or cartridge microfilm to identify frames of the microfilm. This information may be in the form of alphanumeric characters which are visually read on a trial and error basis until the desired frame is properly positioned for reading with a viewer. It is also well known in the art to place control information along the edge of a strip of microfilm to be read by an optical scanner in order to place a desired frame within the viewing field of a viewer.

With respect to microfiche cards, however, a card is placed on an x-y transport, generally manually operated, and the desired frame is obtained, again by a trail and error method through repeated repositionings of the card until the frame appears on the viewer.

Heretofore, microfiche cards have been limited to providing graphic illustrations and/or alphanumeric information, such as generally found in parts ordering and inventory systems.

To generally sum up the state of the art, alphanumeric and digital codes have been provided on reel-type microfilm for visual or electronic observation, while microfiche cards have been provided with visual indicators to identify the position of a frame within a matrix of frames on a card.

SUMMARY OF THE INVENTION

A primary object of the invention is to provide a microfiche card which bears digital information. The digital information may be of several types and may be employed in conjunction with graphic information.

Another object of the invention is to provide a microfiche card in which digital information is employed in conjunction with an optical scanner for locating a certain area on the card, which area may contain digital or graphic information.

Another object of the invention is to provide a microfiche card which, in conjunction with a scanner, locates a desired area to be scanned and adjusts the scanner or card transport, if necessary, with respect to skew so that the scanner and the information to be read are in accurate alignment.

Another object of the invention is to provide static systems by which the information of a microfiche card can be located in a predetermined relation with respect to a scanner through accurate dimensioning of the card and the provision of cooperable structure on the card transport.

Another object of the invention is to provide apparatus for accurately locating a microfiche card with respect to a scanner, including operation of the scanner so as to detect positioning marks on a microfiche card which, after processing, control the positioning of the card transport and/or the scanner.

A microfiche card generally includes a header and a body. The header usually bears some type of text which identifies the card and its general content, while the body of the card bears the information sought to be retrieved. As has been indicated above, and as will be more fully appreciated from the detailed discussions below, the information to be retrieved may be graphic information or, according to the present invention, digital information.

As used herein, "digital information" is generally meant to identify marks, either opaque-on-clear or clear-on-opaque, while the term "graphic information" is generally meant to identify all other forms of information including alphanumeric information, drawings and the like. Also, contrasting colors may be used for digital and/or graphic information when such display is desired, such as for example television applications.

According to the invention, static alignment techniques are provided by which the information on the body of a microfiche card may be accurately aligned with respect to an optical sensor. In a first embodiment, the microfiche card transport is provided with a pair of alignment pins which are received through respective apertures preferably in the header of the microfiche card, the apertures being centered on a line which is spaced from and parallel to a line along the edge of the information to be read from the body of the card.

In another embodiment for static alignment, at least two adjacent edges of the card, preferably the header edge and an adjacent edge, are formed at 90° to each other, and the card transport has corresponding upstanding pins or shoulders, also located at 90° with respect to each other for receiving the aforementioned edges in abutment thereagainst.

According to the present invention a "scanner" microfiche card is intended to define a convenient, read-only, transportable, fileable, data base constructed in standard microfiche form. The card may bear written, graphic, audio or other information. The scanner microfiche may carry the information in digital or analog form and can be read with a scanner, transformed electronically to any desirable form, and displayed or used in any desired manner or can be read with a TV camera and processed as a standard TV picture or signal. When the scanner microfiche is employed to provide data for another machine, (such as a computer) to accept and store, the entire microfiche may contain data only, and incremental encoding, as disclosed below, is not needed, except perhaps for initial alignment or periodic alignment purposes. A "viewer" microfiche is also a convenient, read-only, transportable, fileable, data base in standard microfiche form. The information content may be written, graphic, audio, or other information. In contrast to the scanner microfiche, however, it is intended that the viewer microfiche have the information to be retrieved projected onto a viewing screen.

With respect to the scanner microfiche card, by using COM techniques, the present invention makes it possible to generate, "print" and distribute digital information at less expense and at greater speed than heretofore known. A particular advantage of all of the microfiche cards of the present invention is that information may be distributed, and up-dated, by mail, on an inexpensive basis, to provide a data base which can be accurately aligned with an optical sensor of a scanner or viewer.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a pictorial representation of a static alignment technique using apertured microfiche cards and alignment pins;

FIG. 2 is a pictorial illustration of a static alignment technique using predetermined edge formations and alignment shoulders or pins on a card transport;

FIG. 3 is a plan view of a portion of a scanner microfiche card illustrated in FIG. 4, the information illustrated thereon being hand-generated digital information;

FIG. 7 is a plan view of a portion of a viewer microfiche card which has alignment and locating tracks in the grid between the viewable information frames;

FIGS. 8-10 illustrate scanning, alignment and frame-finding techniques which may be employed in conjunction with the viewer microfiche card of FIG. 7, including proper tracking, frame centering and frame cornering;

FIG. 11 illustrates the use of auxiliary codes on a viewer microfiche card;

FIG. 12 illustrates the use of a redundant auxiliary code on a viewer microfiche card.

DESCRIPTION OF THE PREFERRED EMBODIMENTS

Figure 4:
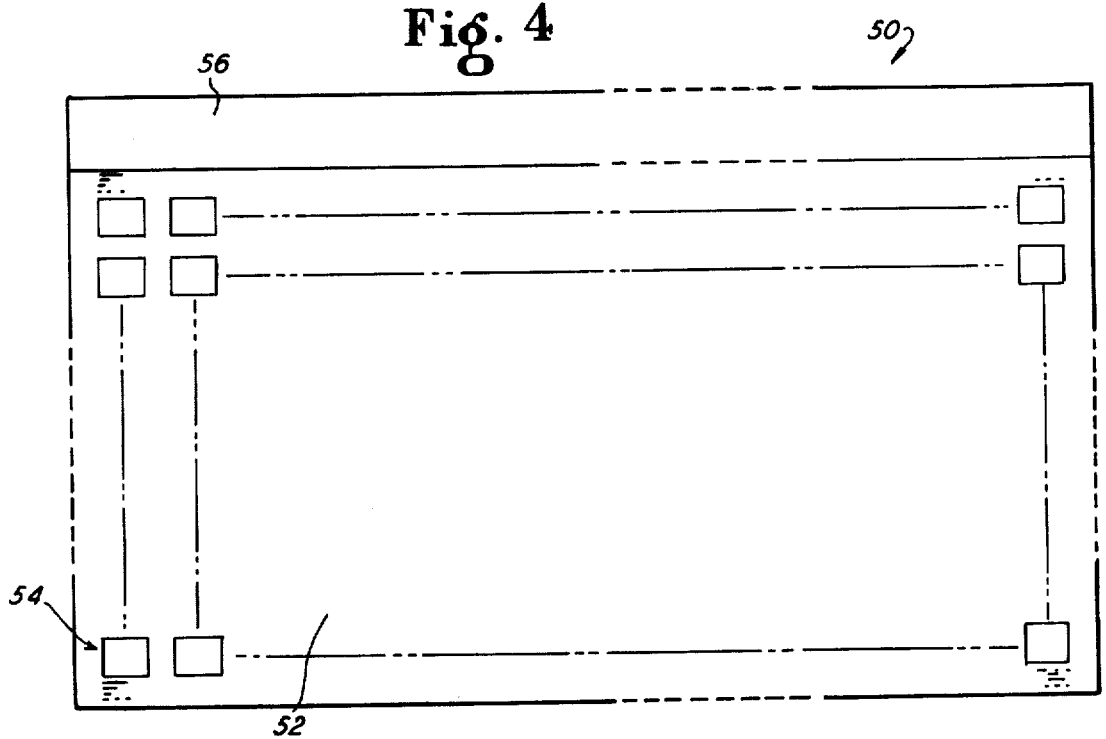

Inasmuch as a plurality of techniques are discussed below for accurately aligning a microfiche card with respect to a sensor, these techniques will be discussed separately in accordance with the following outline.

I. STATIC REGISTRATION
  A. Registration Technique #1
  B. Registration Technique #2
II. SCANNER MICROFICHE CARD
  A. Control Data and Output Data
  B. Reading Scanner Microfiche Card
III. VIEWER MICROFICHE CARD
  A. Tracking
  B. Stop At Frame Center
  C. Stop At Frame Corner
  D. Auxiliary Codes
  E. Reading Viewer Microfiche
  F. Exemplary Program

STATIC REGISTRATION

Referring to FIGS. 1 and 2, static registration techniques for microfiche cards are illustrated. With these techniques, it must be assumed that the transport is accurately located with respect to the viewing light path, and accurately located with respect to a sensor, if a sensor is used, as discussed hereinbelow with respect to locating a particular frame as described in connection with the viewer microfiche card. Static registration, as will be apparent, is less expensive than electronically controlled registration; however, it will also be apparent that static registration can be used in conjunction with electronically-controlled registration to eliminate tracking for a viewer microfiche card.

A. Registration Technique #1

Referring to FIG. 1, a first static registration technique is generally indicated at 10 in which a microfiche card x-y transport 12 is provided to carry a microfiche card 14. The microfiche card 14 includes a header 16 and a body 18. The microfiche card 14 also includes a pair of apertures 24, 26 as registration holes which are located at precise distances with respect to the frame centers 28 and which are punched through the header 16.

Similarly located registration pins 20, 22 are provided on the transport 12 and, in use, the microfiche card 14 is placed on the transport 12 with the registration pins 20, 22 extending through the apertures 24, 26. This technique provides accurate registration of the frames with respect to the viewing screen. Codes of various types may be placed on the microfiche card in the spaces between the frames, as discussed below with respect to the viewer microfiche card, with the exception that tracking lines are not needed and coding can be somewhat more extensive using the same sensor as is used in conjunction with the viewer microfiche card.

B. Registration Technique #2

Referring now to FIG. 2, a second registration technique is generally illustrated at 30 in which a microfiche card x-y transport 32 is provided to carry a microfiche card 34. The microfiche card 34, again, includes a header 36 and a body 38. The microfiche card 34 includes a peripheral edge 40 and an adjacent peripheral edge 42 which are sheared at a precise distance from, and in alignment with, the frames centers, producing a 90° relationship between the edges 40 and 42.

The transport 32 is provided with stop elements, such as pins or shoulders, here the pins 44, 46 and 48, and, in use, the microfiche card 34 is mechanically held against the stop elements during viewing. This provides accurate registration of the frames with respect to the viewing screen.

Again, various types of codes may be placed on the microfiche card in the spaces between the frames, as mentioned in connection with the first registration technique.

From the foregoing discussion, and from the discussion below with respect to the viewer microfiche, it is readily apparent that the two registration techniques may be employed with respect to a viewer microfiche to eliminate tracking. In fact, the two microfiche cards generally discussed in connection with FIGS. 1 and 2 are viewer microfiche cards; the viewer microfiche only being disclosed herein separately to illustrate other techniques, such as tracking and the employment of codes for frame centering and auxiliary purposes.

II. SCANNER MICROFICHE CARD

Before continuing with a discussion of viewer-type cards, and because an operating program immediately follows the discussion of the viewer microfiche card, attention is directed to FIGS. 3-6 which illustrate various techniques of manual-generated and COM-generated data and techniques for ensuring alignment between the data to be retrieved and a sensor.

A. Control Data and Output Data

Referring first to FIGS. 3 and 4, a microfiche card 50 is generally illustrated in FIG. 4 as comprising a body 52 composed of a plurality of information storage areas 54, and a header 56.

In the associated scanner apparatus, discussed in greater detail below, a linear photosensor is oriented transversely to the long dimension of the microfiche card.

In apparatus which has been constructed, the sensor is placed in direct contact with the microfiche card. However, an optical system may be employed to project the microfiche images on a sensor. The use of an optical system is determined by the particular application.

The sensor may comprise a single continuous line of photocells fabricated as a single unit that spans the entire 105 mm, for example, dimension of the microfiche card, or the sensor can be constructed of any number of segments, each segment containing a number of photocells, with the segments fabricated as a single unit that spans the entire 105 mm dimension of the microfiche card. The sensor can also be constructed of a single segment, or a number of segments, that span less than a full width of the microfiche card, or a matrix of cells which can sense a block of data, or a linear sensor in combination with a TV camera.

The light source that activates the sensor is located on the same side of a microcard as the sensor, whereas in microfiche applications the microfiche is located between the source and the sensor.

The entire sensor is moved left-to-right or right-to-left in the long direction of the microfiche. This is, of course, relative motion and in actual practice either the sensor or the card may be the moving element. As will be discussed below, logic circuits control the rate and mode of movement of the sensor.

As will be greatly appreciated by those skilled in the art, the sensor (or the transport) is mounted with a pivot, located at the upper end in the case of the sensor, and a device to move the bottom end of the sensor either left or right is provided to bring the sensor in complete alignment with a single vertical line of data that is to be read.

Referring to FIG. 3, a schematic illustration of a storage area 54 illustrates manually-generated information. Inasmuch as this sample was manually generated, continuous bars have been employed in portions of the coding. The same microfiche card can be generated by COM techniques, in which case the bars would not necessarily be continuous.

The example of a scanner microfiche card illustrated in FIGS. 3 and 4 contains all digital data and is not typical in the sense that all frames are identical and widely spaced.

In a practical scanner microfiche card of this type, centering marks, incremental encoding and start of data codes would be placed only at the top row of frames, and the end of data and bottom sensor alignment codes would be placed only at the bottom row of frames, these codes being shown in FIG. 3 on both sides of the area 54 to aid in understanding the invention. In a microfiche card of this type, there would be very little unused space.

Referring to the storage area 54 illustrated in FIG. 3, the data which is to be retrieved from the microfiche card are provided as opaque-on-clear or clear-on-opaque marks, here opaque-on-clear marks, in the form of rows of data 58 which are aligned transversely of the microfiche card. Again, contrasting colors can be used.

The card bears a plurality of centering marks 60, each of which is aligned with a respective data row 58. The microfiche card also carries incremental and coding data 62, a start of data code 64, the data field 66, and end of data code 68 and bottom sensor alignment codes 70.

With the exception that the end of data code 68 and the bottom sensor alignment codes 70 are actually provided physically displaced on the codes 60, 62 and 64 on a card, the card is laid out in a plurality of elongate data rows 0–80. It is the incremental encoding 62, however, which identifies and forms the addresses of the data rows 58.

Figure 5:
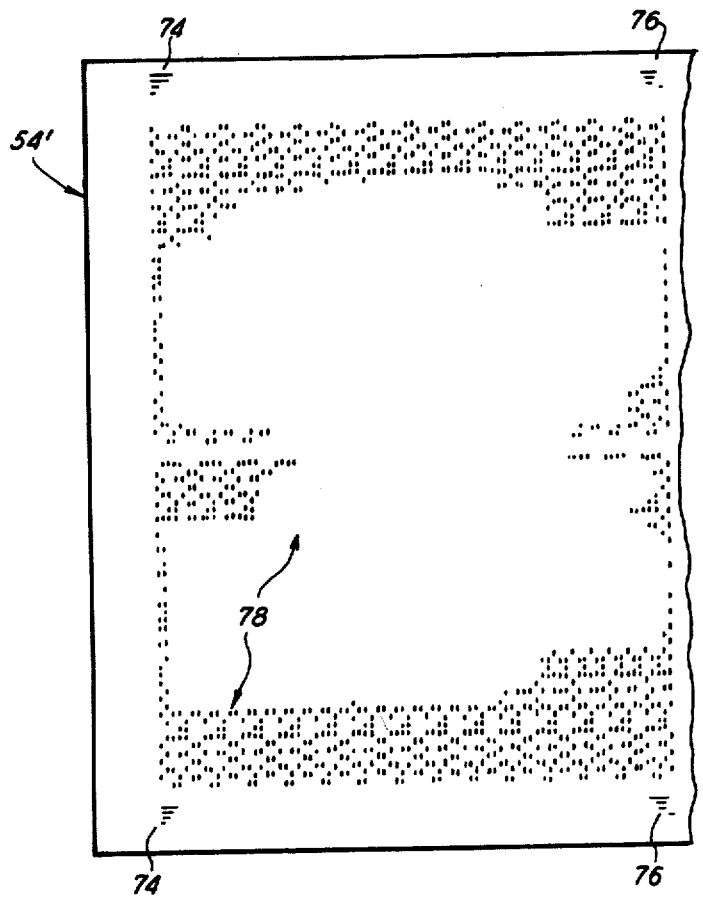
FIG. 5 illustrates a portion of another scanner microfiche card, similar to that illustrated in FIG. 4, on which the digital information is COM-generated information.

Referring to FIG. 5, a storage area 54' is illustrated. This storage area is quite similar to that of FIG. 3, with the exception that the data field, generally indicated at 78, is COM-generated data. This data may also be manually generated. In addition, with this type of microfiche card, although the same may be employed in the same manner as that of FIG. 3, may be employed as a programming tool in which the data 78 is to be fed step-by-step into another machine, such as a microprocessor, computer or the like. In this case, since it is not necessary to access a particular row, the encoding and alignment codes may be provided to ensure alignment at the first data row, such as indicated at 74 and at some other or periodic point or points, such as illustrated at 76. The use of the encoding and alignment marks will be best understood from the following detailed description of reading a scanner microfiche card.

B. Reading Scanner Microfiche Card

When certain information is selected for retrieval, the logic circuits of the scanner apparatus cause the sensor to move across the microfiche card toward the selected data and the logic circuits remember the position of the sensor at all times.

The sensor first moves to the transverse column of frames within which the selected line of data is to be found. After locating the proper column of frames, the sensor advances until it detects the incremental code within that frame defines the address of the selected data. The sensor then moves ahead until it detects the centering mark for that selected incremental code. The centering mark ensures that at least the top of the sensor will be in alignment with the codes at the selected address.

The logic circuits now compare bits 5–8 of the incremental code in the top longitudinal rows to bits 77–80 in the bottom longitudinal rows. If these bits do not correspond, bit for bit, the sensor is rotated in the proper direction, as determined by the logic circuits that compare the bits, to achieve alignment with the entire selected transverse data row 58.

When the bits 5–8 correspond, bit for bit, with the bits 77–80, the sensor has achieved alignment with the selected transverse data row. As previously mentioned, the sensor is pivotally mounted; however, in the alternative the transport may be pivotally mounted.

The sensor is now operated to scan the data transversely of the row aligned therewith and makes use of the information codes that are between the start of data code and the end of data code. Any portion of the data between the start of data code and the end of data code may be used, or ignored, as controlled by the logic circuits.

Figure 6:
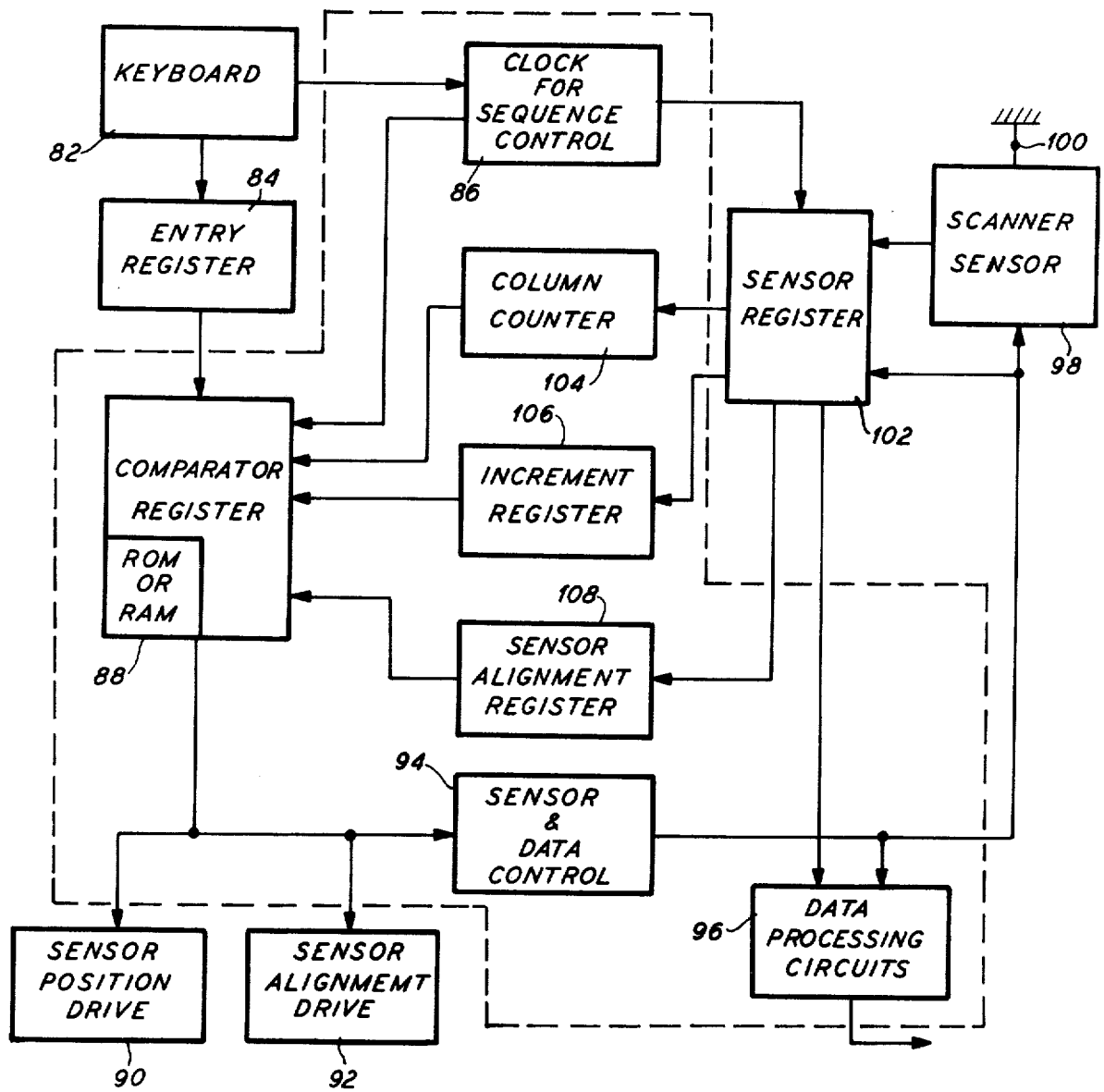
FIG. 6 is a schematic block diagram of a system for aligning a microfiche card, of the types illustrated in FIGS. 3-5, with a scanner sensor.

Referring now to FIG. 6, a more detailed discussion of access and alignment will be given for the scanner microfiche card. In FIG. 6 a keyboard 82 is provided for the user to enter a desired address and an activating order. The address is fed to and held in an entry register 84 and the activating order is fed to a clock 86 for sequence control. The clock 86 is also connected to other elements than illustrated in the drawing, which connections have been omitted for the purpose of clarity, the same being understood to those skilled in the art.

After an address has been entered and an activating order given, a column counter 104 and a comparator register 88 determine which direction to drive the sensor to the selected column.

After the sensor has found the selected column, the sensor steps ahead until the incremental code it reads compares bit for bit with the selected address, then the sensor is stepped ahead in smaller increments until the centering mark of the desired column is detected. The sensor then stops.

It should be noted that the sensor 98 may count any one of the bars, such as the bar 72 to determine the proper frame, and the remainder of the marks of the code, for example, the longitudinal bars in rows 1–8 may be counted to determine the proper transverse row 58.

The incremental code and the sensor alignment code, both being identical, are compared in the comparator register 88 and the sensor 98 is pivotally adjusted, as indicated at 100, so that the codes compare bit for bit.

The entire vertical line of data, that is a data row 58, is now scanned and abstracted or used by the data processing circuits 96 for output to circuits which are to utilize the digital information.

The column counter 104 keeps track of the column in which the sensor is positioned. The increment counter selects the address out of the scanned data, and the sensor alignment register selects sensor alignment codes from the scanned data to control positioning of the sensor. The sensor position drive and the sensor alignment drive are elements which are well known in the art.

The entire circuit outlined in the broken line may be configured from a microprocessor of the type Motorola MC 6800 P, while the sensor register 102 may be formed of any standard well known register and the sensor 98 may be constructed from a well known device, such as the Fairchild CCD 17280. The keyboard 82 and the entry register 84 are also devices which are well known to those skilled in the art.

It should be noted that the comparator register includes a portion identified ROM or RAM, for a read only memory (ROM) or a random access memory (RAM). This is because the microprocessor may include a ROM in which the program is "wired" in. With the aforementioned Motorola device, however, we selected a RAM and it is necessary to feed in a program when the power to the unit is turned on. As will be evident from the discussion below with respect to the viewer microfiche and the program for reading the viewer microfiche, programming of a RAM in a microprocessor or a "wired-in" program for a ROM is well within the skill of those versed in this art.

III. VIEWER MICROFICHE CARD

The viewer microfiche card is generally illustrated at 110 in FIG. 7 as comprising a plurality of frames 112 formed in a matrix and having spaces between the frames which are scanned by a sensor 114 which is positioned, for example, at 45° with respect to the directions of movement of the microfiche card. In the spaces between the frames 112 a plurality of tracking lines 116, 118, 120 are provided in the longitudinal direction of the card and a plurality of tracking lines 122, 124 and 126 are provided in the transverse direction of the microfiche card.

The tracking and code system described herein is one selected for certain of our test purposes, and represents only one of many configurations this scheme can take while still providing the necessary tracking and coding functions.

As illustrated in FIG. 7, the tracking lines 116–126 are not in the viewing areas and are placed on the microfiche card in precise positions relative to the graphic information within the viewing areas 112.

When this microfiche card 110 is employed in a viewer, the lines are projected on the sensor 114 out of the viewing area. The sensor 114 may be constructed of approximately 40 individual photocells and is used to detect the lines and other data. The sensor 114, as mentioned above, is positioned at 45° to the tracking lines to allow a single sensor to detect both vertical and horizontal tracking lines, although two sensors at right angles to the tracking lines could be utilized to perform as well.

The tracking lines may be either clear lines with a black background, or vice-versa. We have planned to use clear lines with a black background; however, the system will work either way.

A. Tracking

Referring to FIG. 8, when the sensor is positioned with respect to the tracking lines 116, 118, 120, as illustrated at 114, all three tracks are sensed, and the microfiche card is in the correct vertical "tracking" position for accessing or viewing. This is the same function as would occur with respect to the registration techniques illustrated and discussed above with respect to FIGS. 1 and 2. If the sensor is in the position illustrated at 114', however, the pattern of photocells sensing the tracks allows the logic circuits to determine the direction the microfiche must be moved to bring the sensor back to the relative position of that illustrated at 114. In the alternative, if the sensor is in the position illustrated at 114", the pattern of sensing photocells will allow the logic circuits to determine that the microfiche card must be moved vertically in a direction opposite to that to correct for the position 114'.

With the 45° orientation of the sensor 114, or two sensors oriented at 90°, the tracking scheme permits the vertical tracking lines 122, 124 and 126 to be followed in the same manner.

The tracking technique amounts to a dynamic, or feedback, registration system, while the registration techniques discussed above are both static registration systems.

The sensor 114 and tracking line position can also be used to provide proportional control. That is, any misalignment, greater than a single cell of the sensor, with respect to the tracking lines, will produce an error signal that can be used to correct the microfiche card position.

B. Stop at Frame Center

Referring to FIG. 9, the tracking lines described above allow for moving the microfiche card in a precise matrix or grid pattern in order to automatically access single or partial frames from a microfiche card.

In order to stop at the proper location to allow a frame to be viewed, a frame center code, for example the code marks 124, 126 and 128 is placed between two of the tracking lines, for example the tracking lines 118 and 120, while a frame center bar is placed between both the top and middle, and the middle and bottom tracking lines, that is between the tracking lines 116 and 118, and between the tracking lines 118 and 120, here illustrated in the form of two marks 130 and 132. In FIG. 9 the reference 114 diagrammatically illustrates the center line of the sensor, while the line 122 diagrammatically illustrates the center line of the frame. With this coding, there are two channels, Channel A and Channel B provided in which the frame center code is located in Channel B and the frame center bar is located in Channels A and B. The frame center code corresponds to the address of the frame in the horizontal direction.

The microfiche card is moved in a direction such that the relative motion of the sensor is left to right in FIG. 9. As the sensor 114 passes over the frame center code marks 124, 126, 128, the sensor detects the three bits of the frame center code, which the logic circuits interpret to mean that the microfiche is to stop when the sensor detects the bit between the upper tracking line 116 and the middle tracking 118, that is in Channel A and the bit between the middle tracking line 118 and the bottom tracking line 120, which is in Channel B.

C. Stop at Frame Corner

Referring to FIG. 10, a corner of a frame may be detected in a manner similar to that discussed above with respect to FIG. 9. The tracking lines 116, 118, 120 and the tracking lines 122, 124, 126 generally come together at the corner of each frame. Therefore, in the longitudinal direction there is still a Channel A and a Channel B, while in the transverse direction there is a Channel AV and a Channel BV. A plurality of frame corner code markings 136, 138 are provided in the Channel B and a plurality of frame corner code markings 140, 142 are provided in the Channel BV, while a frame corner bar is provided in Channel A and Channel B, as illustrated at 144, 146. In FIG. 10, the sensor, again symbolically illustrated at 114, detects the two frame corner codes 136, 138 as it passes thereover. The logic circuits then cause the transport to stop the motion when the frame corner bar 144, 146 is detected.

If downward vertical (transverse) motion is required after reaching a frame corner bar, the sensor 114 would be inhibited for a specific time and move downward. The time of inhibition is selected such that at the rate of motion utilized, the sensor would stand across all three vertical tracking lines before becoming active again. After becoming active, the sensor would "track" the vertical lines to its next point of action.

The logic program may ignore frame center codes and/or frame corner codes and/or any other codes that it may detect during travel along the tracking lines, until a selected point is reached. The distance between the points is measured, for example, by the rate of transport and by the time of transport.

D. Auxiliary Codes

Referring to FIG. 11, codes other than frame center codes, frame corner codes and frame corner and center bars may be placed within any of the tracking lines in Channel A and/or Channel B. For example, in FIG. 11, Channel A includes a code which is provided by the marks 148, 150, 152, 154 and 156, while in Channel B a code is provided with the marks 158, 160, 162, 164 and 166. These codes may be used for an infinite number of purposes, such as frame numbering, frame content designation, branch designation, sound track selection (when used with a complementary audio component), access address to a scanner, and so on. As illustrated in FIG. 11, the codes may be placed in either one or both of the channels.

For extreme reliability requirements, redundant codes may be utilized, as illustrated in FIG. 12. It will be noted that in Channel A there is a code provided by the markings 168', 170', 172' and 174' which is redundant with the code provided by the markings 168, 170, 172 and 174 in Channel B. For added reliability, a parity scheme will be used in addition to redundancy.

Although it has not been mentioned above, it should be readily apparent that all codes, including frame center codes and frame corner codes may take on an infinite variety of forms.

E. Reading Viewer Microfiche Card

Figure 13:
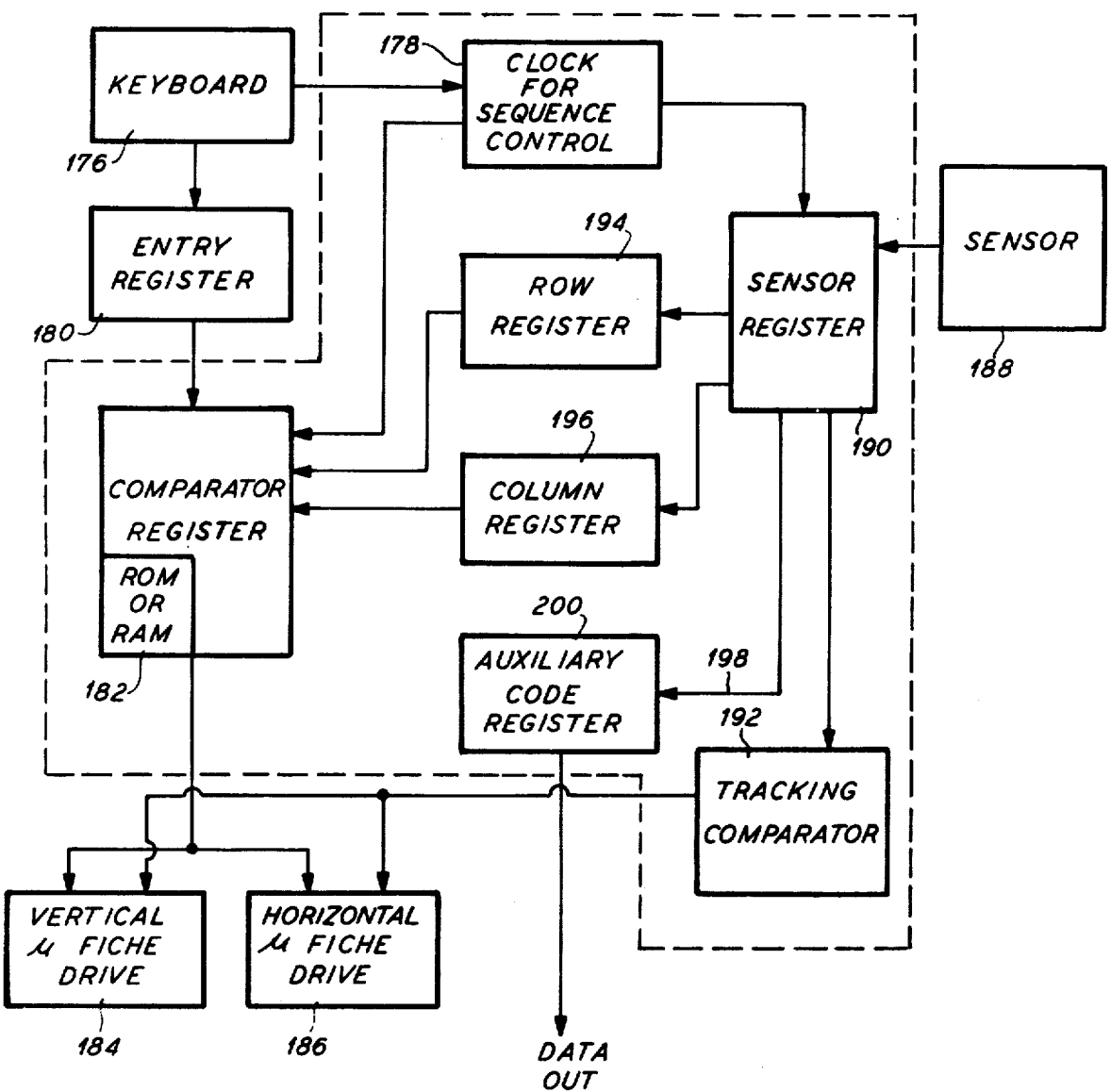
FIG. 13 is a schematic block diagram of a system for transporting and accurately positioning a viewer microfiche card for subsequent viewing.

Referring to FIG. 13, a system and a method for positioning a viewer microfiche card for reading is illustrated in which the apparatus comprises a keyboard 176 and an entry register 180 which are the same as similar elements illustrated in FIG. 6. The user keys in a desired address and an activation order, the address being deposited in the entry register 180 and the activation order being forwarded to the clock 178 for sequence control. Again, the clock is illustrated as being connected only to certain components, while clock connections to other components have been omitted for purpose of simplicity.

After activating, the row register 194, via the comparator register 182, determines the vertical and horizontal direction in which the microfiche must be moved in order to bring the selected frame into the viewing position. The microfiche moves either vertically or horizontally, never diagonally in this system.

The tracking comparator 192 is fed by the sensor 188 by way of the sensor register 190 and compares the track position with a standard track position and controls the horizontal and vertical microfiche drives 186 and 184, respectively, to maintain tracking as discussed above so that the sensor extends over all three tracking lines in the particular direction in which the microfiche is being driven.

The sensor register provides an output 198 as the data output, which output may have interposed therein an auxiliary code register 200 which reads the auxiliary codes, such as are illustrated in FIGS. 11 and/or 12.

The sensor 188 may be a 40 or 60 element sensor of the type discussed above. The vertical and horizontal drives 184 and 186, as well as the keyboard 176 and 180 are well known to those skilled in the art, while the elements bounded by the broken line may be a conventional microprocessor, such as the Intel 8080A or the Motorola MC6800P. As with the apparatus of FIG. 6, the comparator register 182 includes a ROM or a RAM section for storing the program. In a particular device constructed and utilized we have employed the Motorola MC6800P microprocessor with a RAM section so that it was necessary to feed in the program each time the system was energized.

F. Exemplary Program

The following is an exemplary program for accurately positioning a viewer microfiche, or more importantly a desired portion of a viewer microfiche, with respect to a viewer. It should be understood by those versed in this art that a similar program, although a simpler program, may be employed in connection with the apparatus of FIG. 6 for accurate alignment of a data row 58 (FIGS. 3-5) in that the scanner microfiche is generally only operated by movement of the sensor (or transport) in a single direction, in addition to correction of skew by the pivoting of the sensor or the transport.

SYSTEM MONITOR

| | | | | |
|---|---|---|---|---|
| 210 | BD | MONITR: | JSR INIT | Set up peripherals for first move |
| | 00 | | | |
| | 00 | | | Move to upper left corner |
| 220 | 86 | HOME: | LDAA #$3C | Select vert. motor up (Horiz. motor already selected left) |
| | 3C | | | |
| 222 | B7 | | STAA PIACRB | |
| | 80 | | | |
| | 07 | | | |
| 225 | 86 | | LDAA #$FF | Both motors full speed ahead |
| | FF | | | |
| 227 | B7 | | STAA PIAORB | |
| | 80 | | | |
| | 06 | | | |
| 22A | 20 | GO: | BRA GO | Wait here while user resets and engages microswitches at end of move |
| | FE | | | |

| | | | | |
|---|---|---|---|---|
| 22C | BD | | JSR INIT | Reinitiate PIA's after manual reset |
| | 00 | | | |
| | 00 | | | |
| 22F | 86 | STRTPSN: | LDAA #$04 | Routine to move to frame #1 start position at left end of horizontal guidebar |
| | 02 | | | |
| 231 | BD | | JSR BAKHOM | |
| | 05 | | | |
| 234 | 20 | | BRA INITFRAME | Initiate frame pointer to 01 |
| | 37 | | | |

ROUTINE TO SCAN DATA OF ARRAY FOR POSITION AND SIZE OF ALL VALID FEATURES

| | | | | |
|---|---|---|---|---|
| 246 | BD | SCAN: | JSR SRCH | Get first feature |
| | 00 | | | |
| | 1E | | | |
| 249 | CE | | LDX #$00 | Initialize feature array index |
| | 00 | | | |
| | 00 | | | |

| | | | | |
|---|---|---|---|---|
| 24C | DF | | STX CODEPTR | Save it |
| | F3 | | | |
| 24E | 96 | NEXFEAT: | LDAA LITCNT | Feature there? |
| | F2 | | | |
| 250 | 27 | | BEQ END | No -- end of scan |
| | 17 | | | |
| 252 | D6 | | LDAB CODEPTR+1 | Check for more than five features, to protect program from being written over |
| | F4 | | | |
| 254 | C1 | | CMPB #$08 | |
| | 08 | | | |
| 256 | 2E | | BGT END | If more than five, out of focus -- Go to re-read program |
| | 11 | | | |
| 258 | A7 | | STAA CODETREL+1,X | Yes -- Store its size in array, then store its position |
| | F7 | | | |
| 25A | 96 | | LDAA FEATSTRT | |
| | F1 | | | |

```
25C  A7           STAA CODETABL,X
     F6

25E  08           INX           Update pointer for next
                                feature 25F  08           INX 260  DF           STX CODEPTR   Save it again
     F3

262  BD           JSR XTRACT    Extract next feature
     01
     00

265  DE           LDX CODEPTR   Retrieve pointer
     F3

267  20           BRA NEXFEAT   -- Go again
     E5

269  39    END:   RTS
```

```
26A  00

00

00

26D  86    INITFRAME:  LDAA #$01

01

26F  97                STAA PRESFRAME   Present frame = 01

E2
```
─────────────────────────────────────────────

User sets breakpoint
to key in desired
next frame

```
271  BD    ROUTE:      JSR NINES        Routine to calc. route to
                                         next frame -- first convert
     02                                  next frame input to row and
                                         column format
     C5

274  96                LDAA NEXFRAME    To complete final hor. motion
                                         use col. number of next frame
     E1                                  (lower half-byte) to index a
                                         table indicating closest vert.
276  84                ANDA #$0F         bar to final row number

0F
```

| | | | |
|---|---|---|---|
| 278 | B7 | STAA HERE | |
| | 02 | | |
| | 7F | | |
| 27B | CE | LDX ROUTETABL | x contains base address of table |
| | 02 | | |
| | BB | | |
| 27E | E6 | LDAB 0,X | Load address of vertical bar into ACC B |
| | 00 | HERE: | |
| 280 | D7 | STAB HOR2 | Final hor. motion completed as (NEXFRAME − Vertical Bar Address)<br>Hor ↑ ACCA, Bar Addr ↑ ACC B |
| | A9 | | |
| 282 | 90 | SUBA HOR2 | |
| | A9 | | |
| 284 | 97 | STAA HOR2 | Result is neg. for motion to left, pos. for right |
| | A9 | | |
| 286 | 96 | LDAA PRESFRAME | Calc. first hor. motion (present frame → vert. bar) |
| | E2 | | |

| | | | |
|---|---|---|---|
| 288 | 84 | ANDA #$0F | |
| | 0F | | |
| 28A | 97 | STAA HOR1 | As (Vert. bar address [ACCB] − PRESFRAME hor. [ACCA]), |
| | A7 | | |
| 28C | D0 | SUBB HOR1 | |
| | A7 | | |
| 28E | D7 | STAB HOR1 | |
| | A7 | | |
| 290 | 00 | | |
| | 00 | | |
| | 00 | | |
| | 00 | | |
| 294 | 96 | LDAA PRESFRAME | Next, fetch row number of present frame into lower half-byte of ACCA with 0s in upper half-byte |
| | E2 | | |
| 296 | 48 | ASLA | |
| 297 | 48 | ROLA | |

| | | | |
|---|---|---|---|
| 298 | 49 | ROLA | |
| 299 | 49 | ROLA | |
| 29A | 49 | ROLA | |
| 29B | D6 | LDAB NEXFRAME | And same for row number of next frame in ACCB |
| | E1 | | |
| 29D | 58 | ASLB | |
| 29E | 59 | ROLB | |
| 29F | 59 | ROLB | |
| 2A0 | 59 | ROLB | |
| 2A1 | 59 | ROLB | |
| 2A2 | 84 | ANDA #$0F | Mask out upper half-bytes |
| | 0F | | |
| 2A4 | C4 | ANDB #$0F | |
| | 0F | | |
| 2A6 | D7 | STAB VERT | Vert. motion computed as (PRESFRAME$_{vert.}$ − NEXFRAME$_{vert.}$) ACCA ACCB |
| | A8 | | |

| | | | |
|---|---|---|---|
| 2A8 | 90 | SUBA VERT | |
| | A8 | | |
| 2AA | 97 | STAA VERT | POS.=UP NEG.=DOWN |
| | A8 | | |
| 2AC | 26 | BNE DONE | Any vertical motion required? |
| | 09 | | |
| 2AE | 96 | NOVERT: LDAA HOR1 | No-- Combine HOR1, HOR2 into single horizontal motion and store in HOR1 |
| | A7 | | |
| 2B0 | 9B | ADDA HOR2 | |
| | A9 | | |
| 2B2 | 97 | STAA HOR1 | |
| | A7 | | |
| 2B4 | 7F | CLR HOR2 | No need for HOR2 |
| | 00 | | |
| | A9 | | |

| | | | |
|---|---|---|---|
| 2B7 | 7E | DONE: | JMP NEXMOVE   Ready to start move to next frame |
| | 03 | | |
| | 08 | | |
| 2BB | — | ROUTETABLES | — Gives frame address of vertical route to be taken for destination frame whose column number is: ↓ |
| 2BC | 01 | | 1 |
| | 02 | | 2 |
| | 03 | | 3 |
| | 04 | | 4 |
| | 05 | | 5 |
| | 06 | | 6 |
| | 07 | | 7 |
| | 08 | | 8 |
| 2C4 | 09 | | 9 |

Routine to convert between decimal and row-column format for frame numbers

```
2C5   96   NINES:   LDAA NEXFRAME   ACCA gets converted
      E1

2C7   81            CMPA #$19       Is ACCA in row 1 or row 2?
      19

2C9   2D            BLT  1or2       Yes -- Branch around
      03

2CB   7E            JMP  PATCH 6    No -- Continue checking
      01
      E1

2CE   81   1or2:    CMPA #$10       No -- is ACCA in row 1
      10

2D0   2C            BGE  .+3        No -- Branch around
      03
```

```
2D2  7E              JMP LAST      Yes -- No conversion required
     05
     E7

2D5  C6    .+3:      LDAB #$01     ACCB= Conversion amount
     01                            = ±1 for row 2

2D7  7D    DECIDE:   TST CONVRT    Which direction is
     00                            conversion desired?
     A5

2DA  7E              JMP PATCH 9   Go find out
     05
     D3

01E1 81    PATCH6:   CMPA #$30     Is ACCA in bottom row?
     30

1E3  2E              BGT BOTTOM    Yes -- Branch around
     05
```

| | | | | |
|---|---|---|---|---|
| 1E5 | C6 | | LDAB #$02 | Convert by adding ±2 for row 3 |
| | 02 | | | |
| 1E7 | 7E | | JMP DECIDE | Go decide on conversion desired |
| | 02 | | | |
| | D7 | | | |
| 1EA | C6 | BOTTOM: | LDAB #$-30 | For bottom row, subtract ±30 to convert |
| | D0 | | | |
| 1EC | 7E | | JMP DECIDE | —Go do it |
| | 02 | | | |
| | D7 | | | |
| 5D3 | 27 | PATCH9: | CONVERT | If decimal to row/col. desired, do addition |
| | 06 | | | |
| 5D5 | 50 | | NEGB | If row/col. → dec. desired, do subtraction |
| 5D6 | 81 | | CMPA #$19 | If row 1, col. 9, then special case—only subtract 1 instead of 2 |
| | 19 | | | |

```
5D8  26              BNE CONVERT

01

5DA  4C              INCA            Add 1 to composite

5DB  1B   CONVERT:   ABA             Preform conversion here
                                     (add ACCB to ACCA)

5DC  7E              JMP PATCH 10    Check for special decimal
                                     conversions of 19→21 or 21→19
     03

5DF  7D   STORE:     TST CONVRT      Should result be stored in
                                     NEXFRAME? (CONVRT=0)
     00

A5

5E2  26              BNE LAST        No — Branch around

03

5E4  97              STAA NEXFRAME   Yes — Store it

E1

5E6  00

5E7  7F   LAST:      CLR CONVRT      -- Auto clear flag
                                     (conversion is decimal →
     00                              row/col by default)

A5
```

| | | | | |
|---|---|---|---|---|
| 5EA | 39 | | RTS | -- All done |

| | | | | |
|---|---|---|---|---|
| 3A0 | C6 | PATCH 10: | LDAB #$06 | Load decimal adjust term |
| | 06 | | | |
| 3A2 | 81 | | CMPA #$1B | Does conversion result equal 1B (19+2)? |
| | 1B | | | |
| 3A4 | 27 | | BEQ ADD | YES -- ADD decimal term, next |
| | 05 | | | |
| 3A6 | 50 | | NEGB | No -- Negate decimal term for next test |
| 3A7 | 81 | | CMPA #$1F | Does conversion result = 1F (21-2)? |
| | 1F | | | |
| 3A9 | 26 | | BNE BACK | No -- don't adjust |
| | 01 | | | |
| 3AB | 1B | ADD: | ABA | Yes -- add decimal term |
| 3AC | 7E | BACK: | JMP STORE | Now go decide whether to store conversion result |
| | 05 | | | |
| | DF | | | |

Subroutine to search and lock onto a hor. guidebar

| | | | | |
|---|---|---|---|---|
| 2E0 | 96 | FINDBAR: | LDAA MINBAR | |
| | DB | | | |
| 2E2 | 97 | | STAA BARTIME | Load converter with min. time to establish a valid bar |
| | B0 | | | |
| 2E4 | D6 | REFIND: | LDAB OUTVIEW | Which direction is search desired? (outview = 0 for up, 1 for down.) |
| | AC | | | |
| 2E6 | 27 | | BEQ FARLEFT | |
| | 04 | | | |
| 2E8 | 86 | | LDAA #$34 | Down — Select vertical PIA down |
| | 34 | | | |
| 2EA | 20 | | BRA .+2 | |
| | 02 | | | |
| 2EC | 86 | | LDAA #$30 | Select med. vertical search speed |
| | 3C | | | |

```
2F0   B7              STA  PIACRB
      80
      07
2F3   F7              STAB PIAORB     Start motor
      80
      06
2F6   80    LOOK:     JSR  SRCH       Scan present input data
      00                              for guidebar
      1E
2F9   96              LDAA LITCNT     If found, LITCNT will
      F2                              be >0
2FB   27              BEQ  FINDBAR    If not, reset bartime
      E3                              and try again
2FD   7A              DEC  BARTIME    When found, advance timer
      00
      80
```

| | | | |
|---|---|---|---|
| 300 | 96 | LDAA BARTIME | Min. time expired? |
| | B0 | | |
| 302 | 26 | BNE LOOK | No -- keep timing |
| | F2 | | |
| 304 | 7F | CLR PIAORB | Yes -- bar found stop motor |
| | 80 | | |
| | 06 | | |
| 307 | 39 | RTS | Return to caller |
| 320 | 96 | HORIZONTAL: LDAA HORI | PERFORMS NEXT HOR. MOVE: What kind of move is required? |
| | A7 | | |
| 322 | 27 | BEQ HALT | None -- update frame pointers and go back for user input |
| | 4B | | |
| 324 | 2B | BMI LEFTMOVE | Left -- branch here |
| | 0A | | |
| 326 | 86 | LDAA #$3C | Right -- Select direction = right |
| | 3C | | |

DETERMINES NEXT MOVE

| | | | | |
|---|---|---|---|---|
| 308 | BD | NEXMOVE: | JSR HORIZONTAL | Do first hor. move |
| | 03 | | | |
| | 20 | | | |
| 30B | 96 | | LDAA VERT | Any vert. motion required? |
| | A8 | | | |
| 30D | 27 | | BEQ DEST | No -- at destination, update frame pointer |
| | 0A | | | |
| 30F | BD | | JSR VERT | Yes -- do vert. move |
| | 03 | | | |
| | B0 | | | |
| 312 | 96 | | LDAA HOR2 | Prepare for further hor. move if necessary |
| | A9 | | | |
| 314 | 97 | | STAA HOR1 | |
| | A7 | | | |
| 316 | BD | | JSR HORIZONTAL | Then do it |
| | 03 | | | |
| | 20 | | | |

| | | | |
|---|---|---|---|
| 319 | 96 | DEST: LDAA NEXFRAME | |
| | E1 | | |
| 31B | 97 | STAA PRESFRAME | New source in old destination |
| | E2 | | |
| 31D | 7E | JMP CODES | Go read codes at destination |
| | 05 | | |
| | 23 | | |
| 328 | 7C | INC HOR1 | Add in a dummy move so initially finding guidebar is not counted as a frame when moving right. |
| | 00 | | |
| | A7 | | |
| 32B | 97 | STAA HORDIR | Store direction data |
| | DA | | |
| 32D | 7E | JMP IGNR | Jump away from codes to find guidebar |
| | 01 | | |
| | BD | | |

| | | | | |
|---|---|---|---|---|
| 330 | 86 | LEFTMOVE: | LDAA #$34 | Store DIRECTION = LEFT (No dummy move required since initially guidebar is advancing to next frame when moving left |
| | 34 | | | |
| 332 | 97 | | STAA HORDIR | Store direction |
| | DA | | | |
| 334 | 20 | | BRA PREPULS | Determine whether long or short pulse is necessary, Then do it |
| | 20 | | | |
| 336 | 86 | IGNORE: | LDAA #$FF | Routine to pulse through intermediate codes: |
| | FF | | | |
| 338 | 97 | | STAA PULSTIM | Use max. pulse width |
| | F5 | | | |
| 33A | 96 | | LDAA HORDIR | Select proper direction |
| | DA | | | |
| 33C | C6 | | LDAB #$08 | Select med. hor. speed |
| | 08 | | | |

| | | | | |
|---|---|---|---|---|
| 33E | BD | | JSR PULSE | Do the pulse |
| | 01 | | | |
| | F0 | | | |
| 341 | 39 | | RTS | ; Back to caller |

| | | | | |
|---|---|---|---|---|
| 0342 | BD | REGET: | JSR REGISTER | ; Now re-find guidebar for next frame |
| | 03 | | | |
| 344 | 70 | | | |
| 347 | 96 | | LDAA HOR1 | Update frame counter |
| | A7 | | | |
| 349 | 2B | | BMI INCR | In which direction? |
| | 03 | | | |
| 34B | 4A | DECR: | DECA | —Down if positive |
| 34C | 20 | | BRA .+1 | |
| | 01 | | | |
| 34E | 4C | INCR: | INCA | —Up if negative |

| | | | | |
|---|---|---|---|---|
| 34F | 97 | | STAA HOR1 | Store it |
| | A7 | | | |
| 351 | 27 | | BEQ STOP | All done if count is zero |
| | 15 | | | |
| 353 | BD | | JSR CENTER | Now guide along bar to move along next frame |
| | 00 | | | |
| | 53 | | | |
| 368 | 86 | STOP: | LDAA #$34 | Select direction = left |
| | 34 | | | |
| 36A | 97 | | STAA HORDIR | |
| | DA | | | |
| 36C | BD | | JSR CENTER | Guide left along bar to have position at left edge |
| | 00 | | | |
| | 53 | | | |
| 36F | 39 | HALT: | RTS | Return to monitor for next move |

| | | | | |
|---|---|---|---|---|
| 356 | 96 | PREPULS: | LDAA NEXFRAME | ;Start calc. trigger |
| | E1 | | | ;Frame for long code ignore pulse |
| 358 | D6 | | LDAB HORDIR | ;Which direction are we going? |
| | DA | | | |
| 35A | C1 | | CMPB #$34 | ;If left, HORDIR = 34 |
| | 34 | | | |
| 35C | 27 | | BEQ .+1 | ;If left, trigger frame = present frame (Do not increment to next frame) |
| | 01 | | | |
| 35E | 4C | | INCA | ;If right, trigger frame = next frame |
| 35F | 90 | .+1: | SUBA HOR1 | ;Calc. present horizontal ; position to check if at trigger ; frame (= NEXFRAME-HOR1) |
| | A7 | | | |
| 361 | 7E | | JMP PATCH3 | ;Now finish calc., check ; for doing the long pulse, and ; pulse around the codes |
| | 01 | | | |
| | C0 | | | |

THIS PATCH DETERMINES WHETHER FICHE IS
GOING TO JUMP OVER TO RIGHTMOST COLUMN
(COL.9) AND IF NOT GOES AHEAD AND DOES A
LONG PULSE TO GET OVER CODES (IF COL.9,
LONG PULSE WOULD RUN INTO MECHANICAL STOP

```
1C0   00   PATCH3:              ; Frame number after this jump
      00                        ; is already in ACCA
      00
      00
      00
1C5   84        ANDA #$0F       ; Select column from
      0F                        ; frame number
1C7   81        CMPA #$09       ; Is it rightmost column?
      09
1C9   27        BEQ IGNR        ; If so, do a short jump
      10                        ; only
1CB   00
      00
      00
      00
```

```
1CF   86           LDAA #$01   ;Initialize a counter to
      01                       ;do 1 pulse

1D1   97
      D4           STAA PULSNMR

1D3   BD   MORE:   JSR IGNORE  ;Do the pulse
      03
      36

1D6   7A           DEC PULSNMR ;Count it off
      00
      D4

1D9   26           BNE MORE    ;Not done -- then pulse
      F8                       some more 1DB   BD   IGNR:   JSR IGNORE  ;Get around remaining codes
      03
      36

1DE   7E           JMP REGET   ;Go find the
      03                       ;bar again
      42
```

ROUTINE TO REGISTER CENTER BAR
AT START OF NEXT FRAME

| | | | | |
|---|---|---|---|---|
| 370 | 7F | REGISTER: | CLR PULSTIM | Start with min. vert. sweep from present position |
| | 00 | | | |
| | F5 | | | |
| 373 | 96 | SWEEP: | LDAA PULSTIM | Initiates a new sweep |
| | F5 | | | |
| 375 | 8B | | ADDA #$08 | By incrementing the sweep timer |
| | 08 | | | |
| 377 | 97 | | STAA PULSTIM | |
| | F5 | | | |
| 379 | B6 | | LDAA PIACRB | |
| | 80 | | | |
| | 07 | | | |
| 37C | 81 | | CMPA #$34 | |
| | 34 | | | |
| 37E | 27 | | BEQ .+4 | Switch vertical directions |
| | 04 | | | |

```
380  86              LDAA #$34
     34

382  20              BRA .+2
     02

384  86    .+4:     LDAA #$3C
     3C 386  97    .+2:     STAA SAV2      Save direction for additional
     EB                            pulse when bar found 388  C6              LDAB #$30      Select med. slow motor speed
     30                            for narrow sweep range 38A  7C              INC SRCHFLAG   Flag to search for data
     00                            during pulse
     A6

38D  BD              JSR PULSE      Go do it
     01
     F0
```

| | | | |
|---|---|---|---|
| 390 | 96 | LDAA LITCNT | Result of pulse? |
| | F2 | | |
| 392 | 27 | BEQ SWEEP | No data yet -- Go again |
| | DF | | |
| 394 | 86 | LDAA #$01 | ; Additional pulse after registering bar, to make sure bar is in view and prevent misleading end of condition by center |
| | 01 | | |
| 396 | 97 | STAA PULSTIM | ; Small size pulse |
| | F5 | | |
| 398 | 96 | LDAA SAV2 | ; Load same motor direction as before |
| | FB | | |
| 39A | C6 | LDAB #$20 | ; Slow motor speed |
| | 20 | | |
| 39C | BD | JSR PULSE | ; Do the pulse |
| | 01 | | |
| | F0 | | |
| 39F | 39 | RTS | ; End of register routine |

| | | | | |
|---|---|---|---|---|
| 3B0 | 96 | VERTICAL: | LDAA VERT | Performs next vert. move<br>What direction required? |
| | A8 | | | |
| 3B2 | 2B | | BMI DOWNMOVE | Choose proper vert. direction for FINDBAR ROUTINE |
| | 03 | | | |
| 3B4 | 4F | | CLRA | |
| 3B5 | 20 | | BRA STORE | |
| | 02 | | | |
| 3B7 | 86 | DOWNMOVE: | LDAA #$01 | |
| | 01 | | | |
| 3B9 | 20 | STORE: | BRA PATCH9 | Go store it |
| | 1D | | | |
| 3BB | BD | FIND: | JSR FINDBAR | Go across frame vert. to next guidebar |
| | 02 | | | |
| | E0 | | | |
| 3BE | 86 | | LDAA #$34 | Now guide along bar left to home position |
| | 34 | | | |

```
3C0  97        STAA HORDIR
     DA

3C2  BD        JSR CENTER
     00
     53
```
---
```
3C5  96        LDAA VERT     Update frame counter
     A8

3C7  2B        BMI INCR      In which direction?
     03

3C9  4A  DECR: DECA          --Down if positive

3CA  20        BRA .+1
     01

3CC  4C  INCR: INCA          --Up if negative

3CD  97        STAA VERT     Store it
     A8
```

| | | | | |
|---|---|---|---|---|
| 3CF | 26 | | BNE VERT | Done? If not, do another frame |
| | DF | | | |
| 3D1 | 39 | | RTS | Otherwise back to monitor for next |
| 3D8 | 97 | PATCH9: | STAA OUTVIEW | Store vert. direction flag for findbar |
| | AC | | | |
| 3DA | 86 | | LDAA #$FF | Now large hor. and vert. pulses to get away from present guidebar and angle bars |
| | FF | | | |
| 3DC | 97 | | STAA PULSTIM | Max. pulse width |
| | F5 | | | |
| 3DE | 86 | | LDAA #$3C | HORDIR = right |
| | 3C | | | |
| 3E0 | C6 | | LDAB #$07 | HOR.SPEED = medium |
| | 07 | | | |
| 3E2 | BD | | JSR PULSE | Do horizontal pulse |
| | 01 | | | |
| | F0 | | | |

| | | | | |
|---|---|---|---|---|
| 3E5 | 96 | | LDAA OUTVIEW | Which direction for large vertical pulse? |
| | AC | | | |
| 3E7 | 27 | | BEQ UP | |
| | 04 | | | |
| 3E9 | 86 | DOWN: | LDAA #$34 | DOWN if outview = 1 |
| | 34 | | | |
| 3EB | 20 | | BRA .+2 | |
| | 02 | | | |
| 3ED | 86 | UP: | LDAA #$3C | UP if outview = 1 |
| | 3C | | | |
| 3EF | C6 | .+2: | LDAB #$70 | Select med. vert. speed |
| | 70 | | | |
| 3F1 | BD | | JSR PULSE | Do the vertical pulse |
| | 01 | | | |
| | F0 | | | |
| 3F4 | 20 | | BRA FIND | Ready to find next guidebar |
| | C5 | | | |

Routine to bring 2 codes into view, read them and output to "RESULT"

| | | | | |
|---|---|---|---|---|
| 47C | 97 | READ2: | STAA LOWLIM | Store limit from patch 7 for verifying codes |
| | A2 | | | |
| 47E | D7 | | STAB UPLIM | |
| | A3 | | | |
| 480 | 7F | READ2+4: | CLR RESULT | Clear previously read codes |
| | 00 | | | |
| | D9 | | | |
| 483 | 7F | | CLR CODECNT | Clear count for number of codes to read |
| | 00 | | | |
| | DF | | | |
| 486 | 86 | NEXT: | LDAA #$FF | Prepare to use pulse routine with search for light feature |
| | FF | | | |
| 488 | 97 | | STAA PULSTIM | Make search for time big |
| | F5 | | | |

| | | | | |
|---|---|---|---|---|
| 48A | 86 | | LDAA #$34 | Select direction = left |
| | 34 | | | |
| 48C | C6 | | LDAB #$02 | Select slow hor. speed |
| | 02 | | | |
| 48E | 7C | | INC SRCHFLG | Enable data search |
| | 00 | | | |
| | A6 | | | |
| 491 | 7E | | JMP PATCH12 | Search for next code |
| | 02 | | | |
| | 36 | | | |
| 494 | 00 | | | When code is in view, position and read it. Pack code into "RESULT". |
| | 00 | | | |
| 496 | 96 | BACK4: | LDAA CODECNT | |
| | DF | | | |
| 498 | 4C | | | |

| | | | | |
|---|---|---|---|---|
| 499 | 97 | | STAA CODECNT | |
| | DF | | | |
| 49B | 81 | | CMPA #$02 | All codes read? |
| | 02 | | | |
| 49C | 26 | | BNE NEXT | No -- Get and re-read answer |
| | E8 | | | |
| 49E | 39 | | RTS | YES -- Back to monitor |
| 49F | C6 | SWAP: | LDAB #$04 | Routine called by decode to swap digits of result, since last digit was read first — need to rotate 4 bits |
| | 04 | | | |
| 4A1 | 96 | LOOP: | LDAA RESULT | |
| | D9 | | | |
| 4A3 | 2B | | BMI .+3 | |
| | 03 | | | |
| 4A5 | 0C | | CLC | Determine carry for next rotate |
| 4A6 | 20 | | BRA .+1 | |
| | 01 | | | Swap by rotating 4 bits |
| 4A8 | 0D | .+3: | SEC | |

| | | | |
|---|---|---|---|
| 4A9 | 79 | .+1: ROL RESULT | |
| | 00 | | |
| | D9 | | |
| 4AC | 5A | DEC B | All done? |
| 4AD | 26 | BNE LOOP | NO -- rotate again |
| | F2 | | |
| 4AF | 00 | | Yes -- Back to PATCH4 to verify 2nd code |
| 4B0 | BD | PATCH4: JSR VERIFY | Verify code just read, output is re-read = 1 for good read, ∅ for bad |
| | 05 | | |
| 4B3 | D6 | LDAB REREAD | Good read? |
| | A1 | | |
| 4B5 | 27 | BEQ GOOD | Yes -- Return from decode routine |
| | 03 | | |
| 4B7 | 00 | | No -- Go ahead anyway -- Do not re-read code manually or automatically |
| | 00 | | |
| | 00 | | |
| 4BA | 39 | GOOD: RTS | Return to READ 2 |

| | | | | |
|---|---|---|---|---|
| 4BB | BD | PATCH4B: | JSR DECODE | ; When code is in view, position |
| | 03 | | | ; and read it, pack code |
| | FC | | | ; into result |
| 4BE | 86 | | LDAA #$FF | ; Set up another |
| | FF | | | ; long pulse enable, to get off code |
| 4C0 | 97 | | STAA PULSTIM | ; Put the pulse |
| | F5 | | | ; length away |
| 4C2 | 86 | | LDAA #$34 | ; We still want |
| | 34 | | | ; it to go left |
| 4C4 | C6 | | LDAB #$02 | ; And, we want it |
| | 02 | | | ; to go slow |
| 4C6 | 7A | | DEC SRCHFLG | ; Pulse until we get off code |
| | 00 | | | ; (Pulse until dark) |
| | A6 | | | |

```
4C9   BD             JSR PULSE      ; This is what actually
                                    ; makes it go
      01

F0

4CC   7E             JMP BACK4      ; Go back to what was before
                                    ; it was not
      04

95

236   BD   PATCH 12: JSR PULSE      Search for code

01

F0

239   BD             JSR SRCH       At end of search, has
                                    code been found?
      00

1E 23C   96             LDAA LITCNT    If so, data is non-zero

12

23E   26             BNE FOUND      Yes -- Go on

03
```

| | | | | |
|---|---|---|---|---|
| 240 | 7E | | JMP NEXT | No -- Do another search pulse |
| | 04 | | | |
| | 86 | | | |
| 243 | 7E | FOUND: | | Go to decode here |
| | 04 | | | |
| | BB | | | |

Routine executed upon reaching home on destination frame. Reads all codes at destination, chooses next frame address from array based on user key input. Finally, return to home position on the frame and proceeds to user next frame for movement based on key input on 64 or 65.

| | | | | |
|---|---|---|---|---|
| 523 | 96 | CODES: | LDAA PRESFRAME | Where are we now? |
| | E2 | | | |
| 525 | 81 | | CMPA #$34 | If frame 64 or 65 (row 3, 4 or 5), must now read string of codes to be accessed by user keys. |
| | 34 | | | |
| 527 | 27 | | BEQ BLTCODES | |
| | 3A | | | |

| | | | | |
|---|---|---|---|---|
| 529 | 81 | | CMPA #$35 | In normal frame, must only read single code pair to verify location at proper destination. |
| | 35 | | | |
| 52B | 27 | | BEQ KEYCODES | |
| | 36 | | | |
| 52D | 86 | NORMAL: | LDAA #$3F | First store software interrupt code to enable breakpoint for next input automatically |
| | 3F | | | |
| 52F | B7 | | STAA ROUTE | |
| | 02 | | | |
| | 71 | | | |
| 532 | 86 | | LDAA #$01 | Flag for PATCH7 that frame is not 64 or 65 |
| | 01 | | | |
| 534 | 97 | | STAA NORM | |
| | A4 | | | |
| 536 | BD | | JSR PATCH7 | Do conversion and put result in limits to verify codes read. |
| | 05 | | | |
| | 10 | | | |

| | | | | |
|---|---|---|---|---|
| 539 | BD | | JSR READ2 | Now read and verify |
| | 04 | | | |
| | 7C | | | |
| 53C | B6 | SAME: | LDAA #$01 | Initialize number of code pairs read to 1 for getting back home |
| | 01 | | | |
| 53E | 97 | | STAA NUMBER | |
| | DC | | | |
| 540 | BD | | JSR BAKHOM | Get back to home position on frame |
| | 05 | | | |
| | 46 | | | |
| 543 | 7E | | JMP ROUTE | Ready to go with user input |
| | 02 | | | |
| | 71 | | | |

```
546  97   BAKHOM:  STAA PULSNMR
     D4

548  86            LDAA #$80     Use med. pulse width
     80

54A  97            STAA PULSTIM
     F5

54C  86            LDAA #$3C     Pulse direction = right
     3C

54E  C6            LDAB #$08     Pulse speed fast
     08

550  BD            JSR PULSE     Pulse over the codes
     01
     F0

553  7A            DEC PULSNMR
     00
     D4
```

| | | | | |
|---|---|---|---|---|
| 556 | 26 | | BNE BAKHOM | |
| | F0 | | | |
| 558 | BD | | JSR REGISTER | Done jumping over codes, Then find the guidebar |
| | 03 | | | |
| | 70 | | | |
| 55B | BD | | JSR CENTER | Back to left of bar for home position |
| | 00 | | | |
| | 53 | | | |
| 55E | 39 | | RTS | Ready to go on with user input, or automatic route to frame commanded by user key |
| 55F | 00 | | | |
| | 00 | | | |
| | 00 | | | |
| 562 | 00 | | | |

| | | | | |
|---|---|---|---|---|
| 563 | 86 | KEYCODES: | LDAA #$BD | Store original instruction into first instruction of next cycle, to enable automatic routine to frame selected with user key |
| | BD | | | |

| | | | | |
|---|---|---|---|---|
| 565 | B7 | | STAA ROUTE | |
| | 02 | | | |
| | 71 | | | |
| 568 | 86 | | LDAA #$07 | Number of code pairs to be read = 7 |
| | 07 | | | |
| 56A | 47 | | STAA NUMBER | |
| | DC | | | |
| 56C | 97 | | STAA NUMCNT+1 | Init. counter to keep track of codes |
| | DE | | | |
| 56E | 7F | | CLR NORM | Indicate special frame 64 or 65 for PATCH7 |
| | 00 | | | |
| | A4 | | | |
| 571 | 8D | PAIR: | BSR PATCH7 | Calc. limits for valid code read |
| | 9D | | | |
| 573 | BD | | JSR READ2 | Read next pair of codes |
| | 04 | | | |
| | 7C | | | |

| | | | | |
|---|---|---|---|---|
| 576 | DE | | LDX NUMCNT | Load pointer to array for storing the result |
| | DD | | | |
| 578 | 96 | | LDAA RESULT | Fetch result of code |
| | D9 | | | |
| 57A | A7 | | STAA KEYTABL-1,X | Now store in table for access by key input later |
| | E2 | | | |
| 57C | 7A | | DEC NUMCNT+1 | Count off the codes just read |
| | 00 | | | |
| | DE | | | |
| 57F | 26 | | BNE PAIR | Not done yet? Then read another pair of codes |
| | F0 | | | |
| 581 | 86 | SELECT: | LDAA #$C0 | Prepare to light up next frame LED |
| | C0 | | | |
| 58B | 20 | | BRA READKY | Then go wait for user to select next frame with a key |
| | 1B | | | |

Routine to convert present frame number into decimal format for comparison with result of reading codes, and set upper and lower limits to verify code reading

| | | | | |
|---|---|---|---|---|
| 510 | 7C | PATCH7: | INC CONVERT | Enable flag for conversion in this direction |
| | 00 | | | |
| | A5 | | | |
| 513 | BD | | JSR NINES | Do conversion on NEXFRAME (= PRESFRAME); Result of conversion is in ACCA |
| | 02 | | | |
| | C5 | | | |
| 516 | D6 | | LDAB NORM | Is frame normal (not 64 or 65)? |
| | A4 | | | |
| 518 | 27 | | BEQ SPECIAL | No -- Store special limits for codes on frames 64, 65 |
| | 03 | | | |
| 51A | 16 | | TAB | Yes — Both limits are = PRESFRAME |
| 51B | 20 | | BRA SETLIM | Limits are in ACCA, ACCB |
| | 04 | | | |
| 51D | C6 | SPECIAL: | LDAA #$79 | Upper limits for frames 64, 65 is high digit=7, low digit=9 |
| | 79 | | | |

| | | | | |
|---|---|---|---|---|
| 51F | 86 | | LDAA #$60 | Lower limit is high digit=6, low digit=0 |
| | 60 | | | |
| 521 | 39 | SETLIM: | RTS | Return then read 2 intermediately stored ACCA and ACCB into limits |

SWITCH REG. READ PROGRAM -- WAITS FOR SWITCH TO BE PRESSED, LEADS THE REGISTER, WAITS FOR SWITCH RELEASE AND SELECTS NEXT FRAME

| | | | | |
|---|---|---|---|---|
| 585 | 87 | SWITCH: | STAA LEDREG | Light up appropriate LED's |
| | 06 | | | |
| | 00 | | | |
| 588 | B6 | READ1: | LDAA SWREG | Read switch register |
| | 07 | | | |
| | 00 | | | |
| 58B | 81 | | CMPA #$80 | Will have top bit set |
| | 80 | | | |
| 58D | 27 | | BEQ READ1 | Wait for switch to be pressed |
| | F9 | | | |

| | | | | |
|---|---|---|---|---|
| 58F | 80 | | SUBA #$80 | Erase top bit, |
| | 80 | | | |
| 591 | 97 | | STAA KEYREG | And save result |
| | D8 | | | |
| 593 | B6 | READ2: | LDAA SWREG | Wait for switch release |
| | 07 | | | |
| | 00 | | | |
| 596 | 81 | | CMPA #$80 | Top bit will again be set |
| | 80 | | | |
| 598 | 26 | | BNE READ2 | All other bits should be reset |
| | F9 | | | |
| 59A | 86 | | LDAA #$40 | Now clear LED's |
| | 40 | | | |
| 59C | 7E | | JMP PATCH11 | Go finish the routine |
| | 01 | | | |
| | 7A | | | |

| | | | | |
|---|---|---|---|---|
| 17A | 87 | PATCH 11: | STAA LEDREG | Clear LED's |
| | 06 | | | |
| | 00 | | | |
| 17D | 96 | | LDAA PREV | In case of previous bad read, recall previous result before re-reading (In case of next frame, this doesn't matter) |
| | AE | | | |
| 17F | 97 | | STAA RESULT | |
| | D9 | | | |
| 181 | 39 | | RTS | Back to caller |
| 5A0 | BD | READKY: | JSR SWITCH | Read user selection key |
| | 05 | | | |
| | 85 | | | |
| 5A3 | CE | | LDX #$0006 | Yes – Prepare to access table based on switch read |
| | 00 | | | |
| | 06 | | | |
| 5A6 | 86 | | LDAA #$40 | Switch #6 is bit 6 set in SWREG |
| | 40 | | | |

| | | | | |
|---|---|---|---|---|
| 5A8 | 91 | BACK: | CMPA KEYREG | Was this switch pressed? |
| | D8 | | | |
| 5AA | 27 | | BEQ MATCH | Yes -- Go access table |
| | 07 | | | |
| 5AC | 09 | | DEX | No -- Advance table pointer |
| 5AD | 44 | | LSRA | Advance to next down the line |
| 5AE | 26 | | BNE BACK | Last switch checked? No go check another |
| | F8 | | | |
| 5B0 | 7E | ERR1: | JMP SELECT | Yes -- Switch data invalid; Interrupt for user to try again |
| | 05 | | | |
| | 81 | | | |
| 5B3 | A6 | MATCH: | LDAA KEYTABL,X | Fetch code data from table, as selected by switch |
| | E3 | | | |
| 5B5 | 97 | | STAA NEXFRAME | Code data is next frame address |
| | E1 | | | |

| | | | |
|---|---|---|---|
| 5B7 | 86 | LDAA #$04 | Go back to home position before moving to next frame |
| | 04 | | |
| 5B9 | BD | JSR BAKHOM | |
| | 05 | | |
| | 46 | | |
| 5BC | 7E | JMP ROUTE | Ready to do it over again |
| | 02 | | |
| | 71 | | |

GENERAL PURPOSE PATTERN RECOGNITION SUBROUTINE

EXTRACTS FEATURES ACCORDING TO THE FOLLOWING DEFINITIONS

→ Start of feature is two consecutive "light" half-bytes (INPTID = 1)

→ INPTID = 0 -- "DON'T CARE" -- Counts as "light" inside feature, "dark" if outside → End of feature is last "light" half-byte preceeding first "dark" half-byte Calls XAMIN to determine INPTID, scans to end of feature or end of array, whichever first output is feature(Start, Length) in half-bytes If no feature is found, FEATSTRT = 0

```
100   4F   XTRACT:   CLRA           Clear outputs as signal in
                                    case no signal is found 101   97             STAA LITCNT

F2

103   97             STAA FEATSTRT

F1
```

| | | | | |
|---|---|---|---|---|
| 105 | 00 | | | |
| | 00 | | | |
| | 00 | | | |
| | 00 | | | |
| 109 | BD | FSTIME: | JSR XAMIN | Examine next half-byte |
| | 01 | | | |
| | 46 | | | |
| 10C | 86 | | LDAA #$1E | All data examined? |
| | 1E | | | |
| 10E | 91 | | CMPA BYTPTR+1 | |
| | D7 | | | |
| 110 | 26 | | BNE CHKOUT | No -- Go look for start of feature |
| | 01 | | | |
| 112 | 39 | | RTS | Yes -- Go back to caller |
| 113 | 96 | CHKOUT: | LDAA INPTID | What did last half-byte contain? |
| | AA | | | |

| | | | | |
|---|---|---|---|---|
| 115 | 2E | | BGT FIRST 1 | ≥ 75% light -- possible feature |
| | 0B | | | |
| 117 | 7F | | CLR LITCNT | < 75% light -- cancel feature |
| | 00 | | | |
| | F2 | | | |
| 11A | 20 | | BRA FSTIME | + keep looking |
| | ED | | | |
| 11C | 00 | | | |
| | 00 | | | |
| | 00 | | | |
| | 00 | | | |
| | 00 | | | |
| | 00 | | | |
| 122 | 7C | FIRST 1: | INC LITCNT | First light data found -- add to length of feature |
| | 00 | | | |
| | F2 | | | |

| | | | |
|---|---|---|---|
| 125 | 86 | LDAA #$02 | Two consecutive light half-bytes found yet? |
| | 02 | | |
| 127 | 91 | CMPA LITCNT | |
| | F2 | | |
| 129 | 26 | BNE FSTIME | No -- Look for second |
| | DE | | |
| 12B | 96 | LDAA BYTPTR+1 | Yes -- Calculate start of feature |
| | D7 | | |
| 12D | 48 | ASLA | By multiplying bytes |
| 12F | 9B | ADDA HLFPTR | Add half-byte count (0 or 1) |
| | AB | | |
| 130 | 80 | SUBA #$02 | +Subtract two half-bytes, Byte count always looks ahead one byte |
| | 02 | | |
| 132 | 97 | STAA FEATSTRT | Store start of feature |
| | F1 | | |

| | | | | |
|---|---|---|---|---|
| 134 | BD | 2NDTIME: | JSR XAMIN | Look at next half-byte |
| | 01 | | | |
| | 46 | | | |
| 137 | 96 | | LDAA INPTID | Result? |
| | AA | | | |
| 139 | 2A | | BPL SECND1 | ≥50% light (0 or 1) INPTID -- add to feature |
| | 01 | | | |
| 13B | 39 | | RTS | <50% light -- end of feature |
| 13C | 7C | SECND1: | INC LITCNT | Add to feature |
| | 00 | | | |
| | F2 | | | |
| 13F | 86 | CHECKIN: | LDAA #$20 | End of data? |
| | 20 | | | |
| 141 | 91 | | CMPA BYTPTR+1 | |
| | D7 | | | |
| 143 | 26 | | BNE 2NDTIME | No -- look at next half-byte |
| | EF | | | |
| 145 | 3A | | RTS | Yes -- end of feature |

EXAMINE SUBROUTINE

HLFPTR = 0 or 1 HALF-BYTE FROM BYTABL, OUTPUT IS (INPTID = 1 > 1/2 bits set, -1 for < 1/2 bits set, 0 for 1/2 bits set)

| Addr | Code | | Instruction | Comment |
|---|---|---|---|---|
| 146 | DE | | XAMINE: LDX BYTPTR | |
| | D6 | | | |
| 148 | A6 | | LDAA BYTABL+1,X | Fetch data pointed to by BYTPTR |
| | B2 | | | |
| 14A | D6 | | LDAB HLFPTR | Which half-byte is desired? |
| | AB | | | |
| 14C | 26 | | BNE RHLF | If right (low order) ignore next step |
| | 09 | | | |
| 14E | 7C | | INC HLFPTR | If left (high order) point to right for next time, |
| | 00 | | | |
| | AB | | | |
| 151 | 44 | | LSRA | Shift left data into right half-byte with zeros in left half-byte |

| | | | | |
|---|---|---|---|---|
| 152 | 44 | | LSRA | |
| 153 | 44 | | LSRA | |
| 154 | 44 | | LSRA | |
| 155 | 20 | | BRA IDENT | Go on |
| | 08 | | | |
| 157 | 84 | RHLF: | ANDA #$0F | Mask out left byte |
| | 0F | | | |
| 159 | 7A | | DEC HLFPTR | Point to left half-byte for next step |
| | 00 | | | |
| | AB | | | |
| 15C | 7C | | INC BYTPTR+1 | Point to next byte for next step |
| | 00 | | | |
| | D7 | | | |
| 15F | B7 | IDENT: | STAA HERE | Data is used as index for table |
| | 01 | | | |
| | 66 | | | |

| | | | | | |
|---|---|---|---|---|---|
| 162 | CE | | LDX #IDTABL | X contains table base address | |
| | 01 | | | | |
| | 6A | | | | |
| 165 | E6 | | LDAB 0,X | | |
| | 00 | HERE: | | | |
| 167 | D7 | | STAB INPTID | Store result of table look-up | |
| | AA | | | | |
| 169 | 39 | | RTS | All done | |

| | | | | | | | |
|---|---|---|---|---|---|---|---|
| 01 | 16A | FF | IDENT: identifies input data as light (01), dark (FF) or either (00) | 0 | 01 | 172 | FF | 8 |
| 01 | | FF | | 1 | 00 | | 00 | 9 |
| 01 | 16C | FF | | 2 | 00 | 174 | 00 | A |
| 00 | | 00 | | 3 | FF | | 01 | B |
| 01 | 16E | FF | | 4 | 00 | 176 | 00 | C |
| 00 | | 00 | | 5 | FF | | 01 | D |
| 00 | 170 | 00 | | 6 | FF | 178 | 01 | E |
| FF | | 01 | | 7 | FF | | 01 | F |

INTERFACE PROGRAM

INIT - SETS UP INPUT/OUTPUT PIA'S
SRCH - GENERAL PURPOSE SUBROUTINE TO
         FIND FIRST FEATURE
STRINT - START INTERRUPT

| 00 | 0F | INIT: | SEI | Do not interrupt until this routine is completed |
|----|----|-------|-----|---|
| 01 | 86 |       | LDA #$30 | Select DDR for 8004 |
|    | 30 |       |     |   |
| 03 | B7 |       | STA PIACRA |   |
|    | 80 |       |     |   |
|    | 05 |       |     |   |
| 06 | B7 |       | STAA PIACRB | ← And 8006, with falling edge sensor interrupt trig. |
|    | 80 |       |     |   |
|    | 07 |       |     |   |
| 09 | 7F |       | CLR PIACRA | Select all lines of 8004 as inputs |
|    | 80 |       |     |   |
|    | 04 |       |     |   |

| | | | |
|---|---|---|---|
| 0C | 86 | LDAA #$FF | |
| | FF | | |
| 0E | 87 | STAA PIAORB | Select all lines of 8006 as outputs |
| | 80 | | |
| | 06 | | |
| 11 | 96 | LDAA HORDIR | Select proper horizontal direction |
| | DA | | |
| 13 | 87 | TAA PIACRA | + Store in 8005 |
| | 80 | | |
| | 05 | | |
| 16 | 86 | LDAA #$40 | Blank LED's |
| | 40 | | |
| 18 | 87 | STAA LEDREG | |
| | 06 | | |
| | 00 | | |

| | | | | |
|---|---|---|---|---|
| 1B | 0E | | CLI | Now ready for interrupts |
| 1C | 39 | | RTS | Back to monitor |
| 1E | 7C | SRCH: | INC PIACRB | Enable sensor interrupt |
| | 80 | | | |
| | 07 | | | |
| 21 | 3E | | WAI | Wait for new data |
| 22 | 7F | | CLR BYTPTR | Initialize pointers to left edge of view |
| | 00 | | | |
| | D7 | | | |
| 25 | 7F | | CLR HLFPTR | |
| | 00 | | | |
| | A8 | | | |
| 28 | BD | | JSR XTRACT | + Extract leftmost feature |
| | 01 | | | |
| | 00 | | | |
| 2B | 39 | | RTS | Back to caller |

| | | | | |
|---|---|---|---|---|
| 30 | 7A | INTRUP: | DEC PIACRB | Disable further start interrupts |
| | 80 | | | |
| | 07 | | | |
| 33 | CE | | LDX #$00 | Reset input data counter |
| | 00 | | | |
| | 00 | | | |
| 36 | 7C | | INC PIACRA | Enable sensor data interrupt |
| | 80 | | | |
| | 05 | | | |
| 39 | 86 | WAT: | LDAA #$80 | Mask out all but interrupt bit |
| | 80 | | | |
| 3B | B4 | | ANDA PIACRA | |
| | 80 | | | |
| | 05 | | | |
| 3E | 27 | | BEQ WAIT | Wait for interrupt to occur |
| | F9 | | | |

| | | | | |
|---|---|---|---|---|
| 40 | B6 | | LDAA PIAORA | Then fetch input data |
| | 80 | | | |
| | 04 | | | |
| 43 | A7 | | STAA BYTABL,X | +Store in proper byte of table |
| | B1 | | | |
| 45 | 08 | | INX | Update data counter |
| 46 | 8C | | CPX #$20 | All done? |
| | 00 | | | |
| | 20 | | | |
| 49 | 26 | | BNE WAIT | No -- back for next byte |
| | EE | | | |
| 4B | 7A | DONE: | DEC PIACRA | Yes-- disable sensor interrupt until next interrupt routine |
| | 80 | | | |
| | 05 | | | |
| 4E | 96 | | LDAA BYTABL | Shift leftmost data to right end since first data byte was missed |
| | B1 | | | |

| | | | |
|---|---|---|---|
| 50 | 97 | STAA BYTABL+21 | |
| | D1 | | |
| 52 | 3B | RTI | ← Return |

CENTER

| | | | |
|---|---|---|---|
| 53 | BD | CENTER: JSR SRCH | Get start and length of guidebar |
| | 00 | | |
| | 1E | | |
| 56 | D6 | LDAB LITCNT | Length = 0? |
| | F2 | | |
| 58 | 26 | BNE GUIDE | No -- Guidebar was found |
| | 04 | | |
| 5A | 7E | JMP PATCH2 | Yes -- Check to make sure blank data was really seen |
| | 01 | | |
| | A0 | | |
| 5D | 00 | | |

| | | | | |
|---|---|---|---|---|
| 5E | 7F | GUIDE: | CLR BLANKCNT | Guidebar found -- reset blank data flag |
| | 00 | | | |
| | AD | | | |
| 61 | 96 | | LDAA FEATSTRT | Start of bar at left edge of view |
| | F1 | | | |
| 63 | 27 | | BEQ LEFT | Yes -- Go center the bar |
| | 25 | | | |
| 65 | 9B | | ADDA LITCNT | No -- End of bar at right edge of view? |
| | F2 | | | |
| 67 | 81 | | CMPA #$40 | |
| | 40 | | | |
| 69 | 27 | | BEQ RIGHT | Yes -- Go center the bar |
| | 19 | | | |
| 6B | C1 | | CMPB #$04 | No -- Does bar have minimum valid width? |
| | 04 | | | |
| 6D | 2C | | BGE SIDE1 | Yes -- Go see if it needs centering |
| | 2A | | | |

```
6F   86              LDAA #$3C       No-- Enable PIA to stop motor
     3C 71   00

72   20              BRA HORONLY     --Go do it
     0C

74   D6   SIDE:      LDAB FEATSTRT   check if guidebar needs centering
     F1

76   C1              CMPB #$08       ← Left edge extreme, bar must start either left of allowed area
     [08]

78   2D              BLT LEFT
     10

7A   C1              CMPB #$38       ← Right edge extreme
     [38]

7C   2E              BGT RIGHT       Or right of allowed area
     06
```

```
7E  86            LDAA  #$34      No centering required
    34

80  C6   HORONLY: LDAB  #$06      Load horizontal speed only
   [06]

82  20            BRA   STOMOTR   + Store in PIA
    0A 84  86   RIGHT:   LDAA  #$34      If bar too far right(down)
    34                             make vertical direction up;

86  C6            LDAB  #$23      Store - Vert. speed = 2, Hor.
   [23]                            speed = 3

88  20            BRA   STOMOTR   + Store in PIA
    04

8A  86   LEFT:    LDAA  #$3C      If bar too far left (up)
    3C                             make vertical direction
                                   down 8C  C6            LDAB  #$23      Vert. speed = 2, Hor. speed = 3
   [23]
```

| | | | | |
|---|---|---|---|---|
| 8E | B7 | STOMOTR: | STAA PIACRB | Store vertical direction |
| | 80 | | | |
| | 07 | | | |
| 92 | F7 | | STAB PIAORB | + Both motor speeds |
| | 80 | | | |
| | 06 | | | |
| 94 | 00 | | | |
| | 00 | | | |
| 96 | 7E | | JMP CENTER | Back to start |
| | 00 | | | |
| | 53 | | | |
| 99 | 96 | SIDE1: | LDAA HORDIR | Makes sure proper horizontal direction is chosen for this cycle |
| | DA | | | |
| 9B | B7 | | STAA PIACRA | |
| | 80 | | | |
| | 05 | | | |

| | | | | |
|---|---|---|---|---|
| 9E | 20 | | BRA SIDE | |
| | D4 | | | |
| A0 | 39 | END: | RTS | |
| 1A0 | 86 | PATCH 2: | LDAA #$03 | Valid blank at edge of guidebar |
| | 03 | | | |
| 1A2 | B7 | | STAA PIA0RB | Slow down motor in case this is valid blank |
| | 80 | | | |
| | 06 | | | |
| 1A5 | 96 | | LDAA BLANKCNT | Register blank data |
| | AD | | | |
| 1A7 | 4C | | INCA | |
| 1A8 | 81 | | CMPA #$04 | Blank data seen min. number times in a row? |
| | 04 | | | |
| 1AA | 27 | | BEQ .+5 | Yes -- Stop motor and exit from center |
| | 05 | | | |

| | | | | |
|---|---|---|---|---|
| 1AC | 97 | | STAA BLANKCNT | No-- keep timing the blank |
| | AD | | | |
| 1AE | 7E | | JMP CENTER | Back another time |
| | 00 | | | |
| | 53 | | | |
| 1B1 | 86 | .+5: | LDAA #$34 | Store vertical direction |
| | 34 | | | |
| 1B3 | 5F | | CLR B | + Clear both motors |
| 1B4 | B7 | | STAB PIAORB | |
| | 80 | | | |
| | 07 | | | |
| 1BA | 7F | | CLR BLANKCNT | Reset flag automatically |
| | 00 | | | |
| | AD | | | |
| 1BD | 39 | | RTS | True end of guidebar here |

PULSE

| | | | | |
|---|---|---|---|---|
| 1F0 | C1 | PULSE: | CMPB #$10 | B contains motor speed, is pulse vert.?--If so B≥10 |
| | 10 | | | |
| 1F2 | 2D | | BLT HORDIR | No--Store direction in hor. PIA |
| | 05 | | | |
| 1F4 | B7 | | STAA PIACRB | |
| | 80 | | | |
| 1F7 | 20 | | BRA .+8 | |
| | 08 | | | |
| 1F9 | B7 | HORDIR: | STAA PIACRA | |
| | 80 | | | |
| | 05 | | | |
| 1FC | 86 | | LDAA #$34 | If horizontal, motor may not yet be enabled for output, Go do it |
| | 34 | | | |
| 1FE | B7 | | STAA PIACRB | |
| | 80 | | | |
| | 01 | | | |

```
201  F7   +.8:    STAB PIAORB    Start up motor
     80
     06

204  D6           LDAB PULSTIM   Fetch pulse width
     F5

206  5A   MORE:   DECB 207  27           BEQ STOP       Pulse timed out?
     0A 209  96           LDAA SRCHFLG   No -- Data search desired
     A6                          during pulse?

20B  26           BNE JUMP       Yes -- Go look
     0D 20D  4F           CLRA           Execute inner wall 20E  4A   LOOP:   DECA           Loop 20F  26           BNE LOOP
     FD
```

| | | | |
|---|---|---|---|
| 211 | 20 | | BRA MORE ; Go test for end of pulse |
| | F3 | | |
| 213 | 7F | STOP: | CLR PIAORB   Yes-- Stop motor |
| | 80 | | |
| | 06 | | |
| 216 | 7F | | CLR SRCHFLG  Reset input enable Flag |
| | 00 | | |
| | A6 | | |
| 219 | 39 | | RTS   Back to caller |
| 21A | 7E | JUMP: | JMP PATCH1 |
| | 01 | | |
| | 83 | | |
| 183 | D7 | PATCH1: | STAB SAV1 ;Save B to keep count. pulse width |
| | D2 | | |
| 185 | BD | AGAIN: | JSR SRCH ; Go look |
| | 00 | | |
| | 1E | | |

```
189  F6              LDAB SAV1    ; Bring it back
     00
     D2
18D  96              LDAA LITCNT  ; Get the data
     F2
     26              BNE LIGHT    ; Go see what to do about it
     06
8F   96    DARK:     LDAA SRCHFLG ; If no data, stop if <0
                                  ; Keep going if >0
     A6
191  2B              BMI STOP1    ; Here for stop
     06
193  20              BRA MORE1    ; ELSE Here for more pulse
     07
195  96    LIGHT:    LDAA SRCHFLG ; If data there, stop if
                                  ; Search flag >0, and keep
     A6                           ; going if SRCHFLAG <0
197  2B              BMI MORE1    ; Here for more pulse
     03
```

```
199   7E    STOP1:   JMP STOP      ; Here for stop
      02
      13

19C   7E    MORE1:   JMP MORE      ; Here for more pulse
      02
      06
```

DECODE

Positions, reads + packs a code when brought into view by monitor

| | | | | |
|---|---|---|---|---|
| 3F7 | 86 | DECODE-5: | LDAA #$00 | Turn on reread LED |
| | 00 | | | |
| 3F9 | BD | | JSR SWITCH | Only executed if code out of focus -- user presses red switch after focussing, then code reread |
| | 05 | | | |
| | B5 | | | |
| 3FC | 86 | DECODE: | LDAA #$3C | Slow movement in up direction to position + read index bar |
| | 3C | | | |
| 3FE | C6 | | LDAB #$20 | Select slow vert. speed |
| | 20 | | | |
| 400 | B7 | | STAA PIACRB | Store direction |
| | 80 | | | |
| | 07 | | | |
| 403 | F7 | | STAB PIAORB | Store speed to start motor |
| | 80 | | | |
| | 06 | | | |

| | | | |
|---|---|---|---|
| 406 | BD | INDEX: JSR SPCH | Read leftmost feature (Index BAR) |
| | 00 | | |
| | 1E | | |
| 409 | 96 | LDAA FEATSTRT | Look where it starts |
| | F1 | | |
| 40B | 81 | CMPA #$ 20 | Far enough to right? |
| | 20 | | |
| 40D | 2D | BLT INDEX | |
| | F7 | | |
| 40F | 00 | | |
| | 00 | | |
| | 00 | | |
| | 00 | | |
| 413 | 86 | ENOUGH: LDAA #$ 34 | Now reverse direction to bring all data into view |
| | 34 | | |

| | | | | |
|---|---|---|---|---|
| 415 | B7 | | STAA PIACRB | (Index bar at far left) with same slow speed |
| | 80 | | | |
| | 07 | | | |
| 418 | BD | FIX: | JSR SRCH | Fixes index bar at top of view |
| | 00 | | | |
| | 1E | | | |
| 41B | 96 | | LDAA FEATSTRT | Look where index bar starts |
| | F1 | | | |
| 41D | 81 | | CMPA #$10 | Close enough to top |
| | 10 | | | |
| 41F | 2E | | BGT FIX | No -- Keep moving down |
| | F7 | | | |
| 421 | 7E | | JMP CALC | Yes -- Stop motor + calculate size of final positioning pulse |
| | 04 | | | |
| | FB | | | |
| 424 | 8B | FINAL: | ADDA #$0A | Add in exp. deter. pulse width, set up to remove index bar and erase all data in view |
| | 0A | | | |

| | | | |
|---|---|---|---|
| 426 | 97 | STAB PULSINT | |
| | F5 | | |
| 428 | 86 | LDAA #$34 | Direction = down |
| | 34 | | |
| 42A | C6 | LDAB #$30 | Speed = Slow vertical |
| | 30 | | |
| 42C | BD | JSR PULSE | -- Do it; then ready to stabilize view for reading the data bars |
| | 01 | | |
| | F0 | | |
| 42F | 86 | LDAA #$F0 | |
| | F0 | | Long pulse width = delay time |
| 431 | 97 | STAA PULSTIM | |
| | F5 | | |
| 433 | 86 | LDAA #$34 | Do not change motor direction |
| | 34 | | |

| | | | |
|---|---|---|---|
| 435 | 5F | CLRB | No motion during delay |
| 436 | BD | JSR PULSE | Perform the delay - then read to read data |
| | 01 | | |
| | F0 | | |
| 439 | 96 INTERPRET: | LDAA RESULT | ; Routine is to read properly positioned code by interrupting data found in the four quadrants of the view |
| | D9 | | |
| 43B | 97 | STAA PREV | ; Save previous results in case this read is bad |
| | AF | | |
| 43D | BD | JSR SCAN | ; First get the data |
| | 02 | | |
| | 46 | | |
| 440 | 96 | LDAA CODEPTRM | Determine how many features were found, from size of array |
| | F4 | | |
| 442 | 81 | CMPA #$06 | ; Less than three features (6 Bytes?) |
| | 06 | | |

| | | | |
|---|---|---|---|
| 444 | 2D | BLT DECODE-5 | ;YES-- Wait for user switch as signal that focussing has been adjusted, then re-read code |
| | B3 | | |
| 446 | 81 | CMPA #$0A | ; >5 features (10 bytes)? |
| | 0A | | |
| 448 | 2C | BGE DECODE-5 | ; Yes--Wait as above, then re-read code |
| | A9 | | |
| 44A | 96 | LDAA CODETABL | ;No-- Where does first feature start? |
| | F6 | | |
| 44C | 97 | STAA QUAD | ;Initialize quad. marker to start of first feature-- delimits quadrant in which first data bar is expected |
| | EA | | |
| | 00 | | |
| | 00 | | |
| 450 | 7F | CLR BARCNT | Points to data bar presently being interpreted |
| | 00 | | |
| | D3 | | |

```
45B  CE            LDX #$0000

00

00

456  DF            STX  TEMP+2      Points to feature presently
                                    under investigation
     EE 458  00                             ; Look for feature start
                                      within specified tolerance
     00                               of quadrant marker

00

45B  DE   NEXFEAT: LDX TEMP+2       ; Fetch feature pointer

EE

45D  A6            LDAA CODETABL,X  ; Use it to fetch feature
                                      start
     F6

45F  90            SUBA QUAD        ; Find distance from
                                      feature to quad. marker =
     EA                               Abs. value of (FEATSTRT-QUAD)

461  2A            BPL  .+1

01
```

```
463  40              NEGA            ; Change sign only if neg.

464  81      .+1:    CMPA #$06       ; Is feature in quadrant
                                       within tolerance?
     06

466  2F              BLE READ        ; Yes -- Assign it to the
                                       data bar and read it
     68

468  08              INX             ; No -- Advance pointer
                                       to next feature 469  08              INX

46A  DF              STX TEMP+2
     EE 46C  96              LDAA TEMP+3     ; Check for end of feature
                                       array
     EF 46E  91              CMPA CODEPTR+1
     F4

470  2D              BLT NEXFEAT     ; Not at end of array,
                                       keep looking
     E9
```

| | | | |
|---|---|---|---|
| 472 | 00 | | ; If pointing past end of array, no feature was found for the data bar -- Assign thin feature (CODE=1) to the bar by setting carry bit |
| | 00 | | |
| | 00 | | |
| | 00 | | |
| | 00 | | |
| | 00 | | |
| 478 | 0D | SEC | |
| 479 | 7E | JMP ASSIGN | |
| | 04 | | |
| | DA | | |

; Reads selected feature and assigns it to a data bar (0 or 1) then packs data bar into result and sets up for next data bar, if any.

| | | | |
|---|---|---|---|
| 4D0 | 86 | READ: LDAA #$05 | ; Fetch min. size for "FAT" (0) (BAR) |
| | 05 | | |

| | | | | |
|---|---|---|---|---|
| 4D2 | A1 | | CMPA CODETABL+1,X | ; Compare with feature size |
| | F7 | | | |
| 4D4 | 2F | | BLE ZERO | ; Data bar larger, must be 0 |
| | 03 | | | |
| 4D6 | 0D | | SEC | ; Data bar smaller, must be 1 |
| 4D7 | 20 | | BRA ASSIGN | |
| | 01 | | | |
| 4D9 | 0C | ZERO: | CLC | |
| 4DA | 79 | ASSIGN: | ROL RESULT | ; Carry contains data bar value -- Shift left into 2-digit result |
| | 00 | | | |
| | D9 | | | |
| 4DD | 96 | | LDAA BARCNT | ; Check for last data bar |
| | D3 | | | |
| 4DF | 81 | | CMPA #$03 | |
| | 03 | | | |

| | | | | |
|---|---|---|---|---|
| 4E1 | 26 | | BNE SETUP | ; Not yet -- set up for next bar |
| | 07 | | | |
| 4E3 | 96 | | LDAA CODECNT | ; Last bar -- is this first code? |
| | DF | | | |
| 4E5 | 27 | | BEQ PATCH4 | Yes -- Verify the code |
| | C9 | | | |
| 4E7 | 20 | | BRA SWAP | No -- wait until digits are swapped to verify |
| | B6 | | | |
| | 00 | | | |
| 4EA | CE | SETUP: | LDX #$0000 | ; Get feature pointer back to start of array |
| | 00 | | | |
| | 00 | | | |
| 4ED | DF | | STX TEMP+2 | |
| | EE | | | |
| 4EF | 7C | | INC BARCNT | ; Advance bar count |
| | 00 | | | |
| | D3 | | | |

| | | | |
|---|---|---|---|
| 4F2 | 96 | LDAA QUAD | ; Advance quad. marker |
| | EA | | |
| 4F4 | 8B | ADDA #$0E | |
| | 0E | | |
| 4F6 | 97 | STAA QUAD | ; Store it |
| | EA | | |
| 4F8 | 7E | JMP NEXFEAT | ; Start looking for new data bar |
| | 04 | | |
| | 5B | | |

; Check to see if in
; Position for final pulse
; to remove index bar

| | | | |
|---|---|---|---|
| 4FB | 81 | CALC: CMPA #$10 | ; Is index bar still to left of 1/4 mark? |
| | 10 | | |
| 4FD | 2F | BLE NOTRDY | ; Yes -- not read for final pulse -- keep moving down |
| | 06 | | |

| | | | | |
|---|---|---|---|---|
| 4FF | 7F | | CLR PIAORB | ; No -- Stop motor |
| | 80 | | | |
| | 06 | | | |
| 502 | 7E | | JMP FINAL | ; Calculate size of final |
| | | | | ; pulse from index bar position |
| | 04 | | | ; in ACCA |
| | 24 | | | |
| 505 | 7E | NOTRDY: | JUMP DECODE | ; If sent here go back |
| | | | | ; and start positioning |
| | 03 | | | ; over again |
| | FC | | | |
| 508 | 00 | | | |
| | 00 | | | |
| | 00 | | | |
| | 00 | | | |
| | 00 | | | |
| | 00 | | | |
| 50F | 00 | | | |

Subroutine to verify code just read. Low lim., up lim. give accepted range for code verification.

| | | | | |
|---|---|---|---|---|
| 5EB | 96 | VERIFY: | LDAA LOWLIM | Fetch limits -- lower |
| | A2 | | | |
| 5ED | D6 | | LDAB UPLIM | -- upper |
| | A3 | | | |
| 5EF | 7D | | TST CODECNT | 1st or 2nd code? |
| | 00 | | | |
| | EF | | | |
| 5F2 | 26 | | BNE NOMASK | If second (1 code already counted) compare code with full limits |
| | CD | | | |
| 5F4 | 84 | | ANDA #$0F | If first (no codes counted) compare code read with lower digit of limits only |
| | 0F | | | |
| 5F6 | C4 | | ANDB #$0F | |
| | 0F | | | |
| 5F8 | 20 | | BRA NOMASK | Go compare |
| | C7 | | | |

```
5C1  91   NOMASK:  CMPA RESULT   Is code read result less
     D9                           than lower limit?

5C3  2E            BGT SET       ;Yes -- Set re-read flag
     07

5C5  D1            CMPB RESULT   No -- greater than upper
     D9                          limit?

5C7  2D            BLT SET       Yes -- set re-read flag
     03

5C9  4F   CLEAR:   CLRA          No -- clear re-read flag

5CA  20            BRA .+2       Go do it
     02

5CC  86   SET:     LDAA #$01     Set re-read flag here
     01

5CE  97   .+2:     STAA READ     Go do it
     A1

5D0  39            RTS           Return to caller
```

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A digital microfiche for use with an optical scanner, comprising:
    a first storage area bearing optically retrievable first information arranged in a plurality of parallel rows;
    a second storage area bearing identification codes for at least one of said rows and first alignment codes for said one row; and
    a third storage area bearing second alignment codes for said one row identical to said first alignment codes; and
    a centering mark, said centering mark located on the centerline of said one row.

2. The digital microfiche of claim 1, comprising:
    a centering mark, a first alignment code and a second alignment code for each of said rows.

3. The digital microfiche of claim 1, comprising:
    a centering mark, a first alignment code and a second alignment code for at least two spaced apart rows.

4. A digital microfiche for use with an optical scanner, which is movable relative thereto, comprising:
    a microfiche card including a header and a body,
    at least one information bearing frame on said body including a plurality of parallel rows of digital information extending generally perpendicular to said header,
    at least one centering mark located adjacent said header and on the centerline of a respective row,
    a first alignment code on said body at one end of and extending transversely of the respective row, and
    a second alignment code located at the end of the respective row opposite said first alignment code, said first and second alignment codes defining any skew of the row with respect to the scanner when the scanner is reading said centering mark.

5. The digital microfiche of claim 4, comprising:
    a separate centering mark for each of said rows, and wherein said first and second alignment codes extend transversely across all of said rows.

6. The digital microfiche of claim 4, comprising:
    a second centering mark spaced from said one centering mark on the centerline of a corresponding row, and
    other first and second alignment codes at opposite ends of said corresponding row to recheck alignment at said corresponding row as the relative movement of the scanner and card positions the scanner at said corresponding row.

7. A digital microfiche for use with an optical scanner which extends in a first direction and is movable relative the microfiche in a second direction, comprising:
    a microfiche member including a body storing digital information arranged in parallel rows which extend in the first direction,
    a plurality of centering marks, each of said centering marks located on the centerline of a respective row,
    a first band of code marks including a plurality of first code marks which constitute the addresses of each of said rows, said first code marks including first alignment marks, and
    a second band of code marks including second alignment marks, indicate any skew from the first direction between the scanner and a row when the scanner is located to read the respective centering mark.

8. The digital microfiche of claim 7, comprising:
    a start-of-data mark and a end-of-data mark located immediately adjacent and at respective ends of said rows of digital data.

9. The digital microfiche of claim 7, wherein:
    said first and second alignment marks are identical.

10. The digital microfiche of claim 7, comprising:
    information frames which include said rows of digital information, and wherein
    said first band of code marks includes frame identification marks.

11. In a microfiche of the type which has information bearing frames spaced apart in rows which extend in at least a first direction, which frames are to be permeated by a light beam, the microfiche to be carried by a transport which is movable in at least the first direction, the improvement comprising
    a plurality of tracking lines on said microfiche extending in said first direction in the spaces between and adjacent each of said rows of frames to be sensed by a light sensor,
    a plurality of row identification codes between said tracking lines associated with and defining a frame address along the first direction to be read by the light sensor, and
    frame stop codes in the spaces between said tracking lines and at predetermined locations with respect to said frames, to be read by the light sensor.

12. The microfiche of claim 11, wherein said frame stop codes are spaced a predetermined distance from the centers of said frames.

13. The microfiche of claim 11, wherein
    said frame stop codes are spaced a predetermined distance from certain corners of said frames.

14. The microfiche of claim 11, wherein
    the frames are arranged spaced apart in an array so as to extend in the first and a second direction, and said tracking lines are first tracking lines and said row identification codes are first row identification codes, and said frame stop codes are first frame stop codes, and comprising
    a plurality of second tracking lines between said frames and extending in the second direction to be sensed by the light sensor, and
    a plurality of second row identification codes between said second tracking lines and defining a frame address along the second direction to be read by the light sensor, and
    a plurality of said frame stop codes in the spaces between said second tracking lines and at predetermined locations with respect to said frames, to be read by the light sensor.

15. The microfiche of claim 11, comprising
    auxiliary data codes between said tracking lines.

16. The microfiche of claim 15, wherein
    said auxiliary codes are between first and second, and second and third, tracking lines and are redundant.

17. A microfiche reading system for a microfiche which has rows of digital information extending in a first direction, a centering mark on the centerline of at least one of said rows, a first alignment code at one end of the one row, and a second alignment code at the opposite end of the one row, comprising
    a scanner including an optical sensor which extends in the first direction and which is mounted for movement, relative the microfiche, in the first direction and which is pivotally mounted for arcuate movement, relative the microfiche, a sensor position drive and a sensor alignment drive, first means connected to said sensor position drive and operable to cause positioning of said sensor adjacent the one row of digital information in response to detection of the first alignment code, and operable to energize said sensor position drive until said sensor senses the centering mark, second means operable to compare the first and second alignment codes sensed by said sensor and provide a skew error, in response to misalignment of said sensor and the one row, to cause said sensor alignment drive to pivot said sensor to correct for the skew.

18. The microfiche reading system of claim 17, wherein each row has a centering mark, a first alignment code and a second alignment code and wherein said first means comprises a row address input means, a sensor register connected to said sensor for storing information read by said sensor, a counter connected to said sensor register for counting rows, and an increment register connected to said sensor register to cause said position drive to incrementally position said sensor until a centering mark is detected.

19. The microfiche reading system of claim 18, wherein said second means comprises a sensor alignment register connected to said sensor register for storing sensed first and second alignment codes, said first and second means including a programmed comparator register having inputs connected to said input means, said counter, said increment register and said alignment register, and outputs connected to said position and alignment drives, for causing positioning and alignment of said sensor in response to the data received at its inputs.

20. A microfiche reading system for positioning, in a viewing position, a selected frame of a microfiche which has a plurality of spaced-apart frames arranged in rows which are aligned in at least one direction and which frames have respective address codes stored on the microfiche, comprising a microfiche transport and an optical scanner, a selected one of said transport and optical scanner being movable to provide relative movement therebetween along the one direction, said transport supporting the microfiche adjacent said optical scanner, said scanner operable to read said stored addresses and provide corresponding first address signals corresponding to the frame address being scanned, register means connected to said scanner for storing said first address signals, drive means including positioning means connected to the movable one of said microfiche transport and optical scanner and operable to move the same along the one direction, address input means for generating second addresss signals representing a selected frame to be positioned at the viewing position, and control means connected to said drive means and to said address input means and said register means for comparing said first and second address signals and causing operation of said drive means in response to differences therebetween.

21. The system of claim 20, wherein the microfiche includes a plurality of parallel tracking lines extending along the rows of frames, and wherein said scanner includes track scanning means for detecting the tracking lines and providing tracking signals, said drive means includes error means for causing movement in a second direction perpendicular to the one direction, and said system comprises a tracking comparator connected to said track scanning means for comparing said tracking signals to reference tracking signals and providing tracking error signals to said error means to cause compensating movement to correct tracking.

22. A microfiche reading system for positioning, in a viewing position, a selected frame of a microfiche which has a plurality of frames arranged spaced-apart in an array of columns and rows and frame column and row addresses codes stored on the microfiche in the spaces between the columns and the rows, respectively, comprising address input means operable to generate selected column and row address signals corresponding to a desired frame to be viewed, a microfiche transport for supporting the microfiche and including first positioning means operable in response to first positioning signals to move the microfiche along the column direction and second position means operable in response to second positioning signals to move the microfiche along the row direction, optical scanning means adjacent said microfiche transport for reading said column and row address codes and producing corresponding column and row address signals, control means connected to said scanning means and said address input means and to said transport for comparing said selected and corresponding address signals and generating the first and second positioning signals in response to differences between the selected and read addresses.

23. A data record to be read with an optical scanner which extends in a first direction, comprising a microfiche card, said microfiche card including at least one first information storage area storing output data in rows which extend in the first direction, at least one second information storage area storing row center data aligned with and indicating the centers of the rows of output data, third and fourth, spaced apart, information storage areas, said third information storage area storing row identification data for each row of output data, and each of said third and fourth information storage areas storing, for each row of output data, skew data oriented with respect to the first direction such that the scanner must read different skew data when there is skew of the scanner with respect to a row of output data.

24. The data record of claim 23, wherein:

said third and fourth information storage areas lie on opposite sides of said first information storage area.

25. The data record of claim 23, wherein:

said second information storage area comprises a plurality of center marks extending in a row in a second direction.

26. The data record of claim 25, wherein:

said third and fourth information storage areas lie on opposite sides of said first information storage area.

27. The data record of claim 26, wherein:
said third information area lies between said first and second information areas.

28. The data record of claim 23, wherein:
said output data is in digital form.

29. The data record of claim 28, wherein:
said output data comprises COM generated data.

30. The data record of claim 23, wherein:
said row identification is in digital form.

31. The data record of claim 23, wherein:
said skew data is in digital form.

32. The data record of claim 31, wherein:
said skew data comprises a pair of identical digital codes located in said third and fourth information storage areas, respectively.

33. The data record of claim 23, wherein:
said information storage areas are carried across said microfiche card in the order of second, third, first and fourth information storage areas.

34. A data record to be read by an optical scanner which extends in a first direction, comprising
a microfiche data carrier,
a plurality of parallel rows of output data borne by said data carrier,
a plurality of first marks borne by said data carrier extending in a row in a second direction, each mark aligned centered of a respective row of output data,
a plurality of second marks adjacent and identifying respective rows of output data,
a plurality of third marks forming a first digital skew code at and on each side of a centerline through each first mark and its respective row of output data,
a plurality of fourth marks forming a second digital skew code identical to the first digital skew code at and on each side of each of the centerlines, said skew codes defining skew upon misalignment of the scanner and a centerline.

35. A data record to be scanned in a first direction by an optical scanner, comprising:
a microfiche card including a plurlity of rows of digital output information, each of said rows extending parallel to each other of said rows and perpendicular to the direction of scanning; and
skew coding on said microfiche card extending on each side of the centerline of at least one row of digital output information to define skew misalignment between the scanner and the centerline, at the beginning of a scan.

36. A method of aligning an optical sensor with a row of digital information carried by a microfiche, comprising the steps of:
applying an address code for the row on the microfiche to identify the row, including first alignment data at one end of the row,
applying a center mark on the centerline of the row, applying second alignment data on the microfiche at the opposite end of the row,
scanning across the microfiche until the address code is sensed, continuing scanning until the center mark is sensed,
reading and comparing the first and second alignment codes to determine any skew between the centerline of the sensor and the centerline of the row.

37. The method of claim 36, comprising the further steps of: correcting skew between the sensor and the row.

38. The method of claim 37, comprising the further step of:
scanning the digital information of the row and generating corresponding output signals.

39. A method of positioning a frame of a microfiche at a viewing position, comprising the steps of:
applying digital address codes along a row of frames,
applying a frame stop code for each frame on the microfiche, scanning across the row of frames with an optical sensor until a desired address code is sensed, and
continuing scanning until a frame stop code is sensed.

40. The method of claim 39, further comprising the steps of:
applying a plurality of parallel tracking lines on the microfiche parallel to the row of frames,
sensing the tracking lines while scanning for the desired address code, and
correcting the relative positions of the sensor and microfiche to maintain all tracking lines within the sensing range of the sensor.

41. In a microfiche of the type which has information bearing frames spaced apart in rows which extended in at least a first direction, which frames are to be permeated by a light beam, the microfiche to be carried by a transport which is movable in at least the first direction, the improvement comprising
at least one tracking line on said microfiche extending in said first direction parallel to said rows of frames to be sensed by a light sensor,
a plurality of row identification codes associated with and defining frame addresses on said microfiche along the first direction to be read by the light sensor, and
frame stop codes at predetermined locations with respect to said frames, to be read by the light sensor.

42. A data record to be scanned in a first direction by an optical scanner, comprising:
a microfiche card including a plurality of rows of digital output information, each of said rows extending parallel to each other of said rows and perpendicular to the direction of scanning; and
a pair of skew codes, each skew code located spaced from the other skew code at and on each side of the centerline of the first row to define skew misalignment between the scanner and the centerline, at the beginning of the scan.

43. An information record comprising:
a microfilm body including peripheral edge extending about said body, a marginal first area adjacent said peripheral edge and a second area adjacent said first area;
said second area bearing rows of digital information; and
said first area bearing digital addresses, each address adjacent and identifying a respective row of digital information.

44. An information record comprising:
a microfilm body including a peripheral edge extending about said body, a marginal first area adjacent said peripheral edge and a second area adjacent said first area;
said second area including sub-areas bearing graphic information; and
said first area bearing digital addresses, each address identifying a respective sub-area of graphic information.

* * * * *